(12) United States Patent
Oyanagi et al.

(10) Patent No.: US 10,475,481 B2
(45) Date of Patent: *Nov. 12, 2019

(54) MAGNETIC TAPE HAVING CHARACTERIZED BACKCOAT LAYER AND METHOD OF MANUFACTURING THE SAME

(71) Applicant: FUJIFILM Corporation, Tokyo (JP)

(72) Inventors: Masahito Oyanagi, Minami-ashigara (JP); Norihito Kasada, Minami-ashigara (JP); Eiki Ozawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,821

(22) Filed: Feb. 2, 2017

(65) Prior Publication Data

US 2017/0221516 A1    Aug. 3, 2017

(30) Foreign Application Priority Data

Feb. 3, 2016    (JP) .................. 2016-018821

(51) Int. Cl.
  G11B 5/73      (2006.01)
  G11B 5/735     (2006.01)
  (Continued)

(52) U.S. Cl.
  CPC .............. G11B 5/735 (2013.01); G11B 5/70 (2013.01); G11B 5/733 (2013.01); G11B 5/7305 (2013.01);
  (Continued)

(58) Field of Classification Search
  None
  See application file for complete search history.

(56) References Cited

U.S. PATENT DOCUMENTS 3,966,686 A    6/1976    Asakura et al.
4,112,187 A    9/1978    Asakura et al.
(Continued)

FOREIGN PATENT DOCUMENTS

DE    101 46 429 A1    3/2002
GB    2495356 A        4/2013
(Continued)

OTHER PUBLICATIONS

Notice of Allowance dated Aug. 30, 2017, which issued during the prosecution of U.S. Appl. No. 15/466,143.
(Continued)

*Primary Examiner* — Kevin M Bernatz
(74) *Attorney, Agent, or Firm* — Sughrue Mion, PLLC

(57) ABSTRACT

The magnetic tape has a magnetic layer and a backcoat layer. The Ra on the magnetic layer side surface is less than or equal to 1.8 nm, the coefficient of friction measured on the base portion of the magnetic layer side surface is less than or equal to 0.35, and the Ra measured on the backcoat layer side surface is less than or equal to 5.0 nm. The backcoat layer contains a fatty acid ester. In addition, the $FWHM_{before}$ measured on the backcoat layer side surface before vacuum heating is greater than 0 nm but less than or equal to 10.0 nm, the $FWHM_{after}$ after vacuum heating is greater than 0 nm but less than or equal to 10.0 nm, and the difference between the spacing measured on the backcoat layer side surface after and before vacuum heating is greater than 0 nm but less than or equal to 8.0 nm.

19 Claims, 1 Drawing Sheet

(51) Int. Cl.
*G11B 5/70* (2006.01)
*G11B 5/733* (2006.01)
*G11B 5/78* (2006.01)
*G11B 5/84* (2006.01)
*G11B 5/008* (2006.01)

(52) U.S. Cl.
CPC .............. *G11B 5/78* (2013.01); *G11B 5/8404* (2013.01); *G11B 5/8412* (2013.01); *G11B 5/00813* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1* | 3/2001 | Shimomura ............. | G11B 5/70 428/141 |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2* | 9/2013 | Imaoka ............... | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2* | 8/2017 | Kasada ................ | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1* | 10/2017 | Kasada ................ | G11B 5/712 |
| 9,837,104 B1 | 12/2017 | Biskeborn | |
| 9,837,116 B2* | 12/2017 | Ozawa ............... | G11B 5/00813 |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2* | 5/2018 | Kasada ................ | G11B 5/68 |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2* | 7/2018 | Kasada ................ | G11B 5/708 |
| 10,026,433 B2* | 7/2018 | Kasada ................ | G11B 5/78 |
| 10,026,434 B2* | 7/2018 | Oyanagi ................ | G11B 5/70 |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 | 1/2019 | Ozawa et al. | |
| 2001/0038928 A1* | 11/2001 | Nakamigawa ........... | G11B 5/70 428/832.2 |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1* | 9/2003 | Inoue ..................... | G11B 5/735 428/845.4 |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1* | 2/2006 | Kuse ...................... | G11B 5/708 428/844 |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1* | 4/2010 | Nakamura ............ | G11B 5/735 428/832 |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1* | 1/2011 | Kaneko ............... | C08G 73/0206 430/7 |

(56) References Cited

U.S. PATENT DOCUMENTS

| | | |
|---|---|---|
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1* | 2/2012 | Tanaka ............... G11B 5/71 428/840.2 |
| 2012/0177951 A1 | 7/2012 | Yamazaki et al. |
| 2012/0183811 A1 | 7/2012 | Hattori et al. |
| 2012/0196156 A1* | 8/2012 | Suzuki ............... G11B 5/70 428/844 |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1* | 10/2013 | Yamazaki ............... H01F 1/01 252/62.58 |
| 2013/0260179 A1 | 10/2013 | Kasada et al. |
| 2013/0279040 A1* | 10/2013 | Cideciyan ............... H03M 13/13 360/53 |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1* | 3/2016 | Ashida ............... G06F 11/1469 707/684 |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1* | 3/2017 | Ozawa ............... G11B 5/70 |
| 2017/0130156 A1 | 5/2017 | Kondo et al. |
| 2017/0178675 A1 | 6/2017 | Kasada |
| 2017/0178676 A1* | 6/2017 | Kasada ............... G11B 5/70626 |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1* | 8/2017 | Oyanagi ............... G11B 5/70 |
| 2017/0221517 A1* | 8/2017 | Ozawa ............... G11B 5/70 |
| 2017/0249963 A1* | 8/2017 | Oyanagi ............... G11B 5/71 |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1* | 12/2017 | Ozawa ............... G11B 5/78 |
| 2017/0372740 A1* | 12/2017 | Ozawa ............... G11B 5/78 |
| 2017/0372741 A1* | 12/2017 | Kurokawa ............... G11B 5/78 |
| 2017/0372742 A1 | 12/2017 | Kaneko et al. |
| 2017/0372743 A1 | 12/2017 | Kasada et al. |
| 2017/0372744 A1* | 12/2017 | Ozawa ............... G11B 5/584 |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1* | 6/2018 | Kaneko ............... G11B 5/00826 |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1* | 6/2018 | Kasada ............... G11B 5/78 |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1* | 8/2018 | Kasada ............... G11B 5/735 |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1* | 4/2019 | Kasada ............... G11B 5/72 |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61139932 A * | 6/1986 |

(56) References Cited

FOREIGN PATENT DOCUMENTS

| | | |
|---|---|---|
| JP | 63-129519 A | 6/1988 |
| JP | 63249932 A | 10/1988 |
| JP | 64-57422 A | 3/1989 |
| JP | 6460819 A | 3/1989 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-273051 A | 10/1999 |
| JP | 2000-251240 A | 9/2000 |
| JP | 2002-157726 A | 5/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-133997 A | 4/2004 |
| JP | 2004-185676 A | 7/2004 |
| JP | 2005-038579 A | 2/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-273039 A | 10/2007 |
| JP | 2007-287310 A | 11/2007 |
| JP | 2007-297427 A | 11/2007 |
| JP | 2008-243317 A | 10/2008 |
| JP | 2009-283082 A | 12/2009 |
| JP | 2010-036350 A | 2/2010 |
| JP | 2010-049731 A | 3/2010 |
| JP | 201148878 A | 3/2011 |
| JP | 2011-138566 A | 7/2011 |
| JP | 2011-210288 A | 10/2011 |
| JP | 2011-225417 A | 11/2011 |
| JP | 2012-038367 A | 2/2012 |
| JP | 2012043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-71926 A | 5/2016 |
| JP | 2016-139451 A | 8/2016 |

OTHER PUBLICATIONS

An Office Action dated May 2, 2018, which issued during the prosecution of U.S. Appl. No. 15/280,195.
An Office Action dated May 7, 2018, which issued during the prosecution of U.S. Appl. No. 15/626,832.
An Office Action dated May 4, 2018, which issued during the prosecution of U.S. Appl. No. 15/422,944.
An Office Action dated May 7, 2018, which issued during the prosecution of U.S. Appl. No. 15/624,792.
An Office Action dated May 7, 2018, which issued during the prosecution of U.S. Appl. No. 15/624,897.
An Office Action dated May 4, 2018, which issued during the prosecution of U.S. Appl. No. 15/625,428.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Notice of Allowance dated Dec. 2, 2016 which issued during the prosecution of U.S. Appl. No. 14/753,227.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Office Action dated Feb. 4, 2016 which issued during the prosecution of U.S. Appl. No. 14/753,227.
Notice of Allowance dated Jul. 12, 2017 which issued during the prosecution of U.S. Appl. No. 15/388,864.
Office Action dated Jun. 9, 2017 which issued during the prosecution of U.S. Appl. No. 15/388,864.
Office Action dated Apr. 26, 2017 which issued during the prosecution of U.S. Appl. No. 15/388,864.
Office Action dated Jun. 7, 2018 which issued during the prosecution of U.S. Appl. No. 15/380,309.
Office Action dated Aug. 3, 2018 which issued during the prosecution of U.S. Appl. No. 15/388,911.
Office Action dated May 30, 2018 which issued during the prosecution of U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
An Office Action dated Oct. 3, 2018, which issued during the prosecution of U.S. Appl. No. 15/280,195.
An Office Action dated Jul. 6, 2018, which issued during the prosecution of U.S. Appl. No. 15/848,173.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
An Office Action dated Oct. 15, 2018, which issued during the prosecution of U.S. Appl. No. 15/619,012.
An Office Action dated Oct. 9, 2018, which issued during the prosecution of U.S. Appl. No. 15/628,814.
An Office Action dated Oct. 22, 2018, which issued during the prosecution of U.S. Appl. No. 15/854,439.
An Office Action dated Sep. 24, 2018, which issued during the prosecution of U.S. Appl. No. 15/690,400.
An Office Action dated Sep. 27, 2018, which issued during the prosecution of U.S. Appl. No. 15/690,906.
An Office Action dated Oct. 12, 2018, which issued during the prosecution of U.S. Appl. No. 15/626,355.
An Office Action dated Oct. 12, 2018, which issued during the prosecution of U.S. Appl. No. 15/627,696.
An Office Action dated Sep. 27, 2018, which issued during the prosecution of U.S. Appl. No. 15/854,383.
An Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Communication dated Dec. 6, 2016 from the U.S. Patent and Trademark Office in U.S. Appl. No. 14/757,555.
Communication dated Dec. 5, 2016 from the U.S. Patent and Trademark Office in U.S. Appl. No. 14/978,834.
Notice of Allowance dated May 8, 2017, which issued during the prosecution of U.S. Appl. No. 14/757,555.

(56) References Cited

OTHER PUBLICATIONS

Notice of Allowance dated May 8, 2017, which issued during the prosecution of U.S. Appl. No. 14/978,834.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Office Action dated Nov. 29, 2018, which issued during the prosecution of U.S. Appl. No. 15/380,309.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Dec. 20, 2018 in U.S. Appl. No. 15/900,106.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Notice of Allowance dated Aug. 27, 2018 in U.S. Appl. No. 15/920,635.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.

(56) References Cited

OTHER PUBLICATIONS

Office Action dated Nov. 19, 2018 in U.S. Appl. No. 15/900,141.
Notice of Allowance dated Apr. 30, 2019 in U.S. Appl No. 15/380,309.
Office Action dated Apr. 4, 2019 in U.S. Appl No. 16/184,312.
Notice of Allowance dated May 13, 2019 in U.S. Appl No. 15/900,379.
U.S. Appl No. 15/900,412, Patented as U.S. Pat. No. 10,062,4032.
Notice of Allowance dated Jun. 6, 2019 in U.S. Appl No. 15/854,383.
Notice of Allowance dated May 14, 2019 in U.S. Appl No. 15/900,164.
Notice of Allowance dated May 15, 2019 in U.S. Appl No. 15/900,106.
Notice of Allowance dated May 15, 2019 in U.S. Appl No. 15/900,242.
Notice of Allowance dated May 16, 2019 in U.S. Appl No. 15/614,876.
Notice of Allowance dated May 16, 2019 in U.S. Appl No. 15/621,464.
Notice of Allowance dated May 24, 2019 in U.S. Appl No. 15/900,345.
Notice of Allowance dated May 24, 2019 in U.S. Appl No. 16/143,646.
Notice of Allowance dated May 28, 2019 in U.S. Appl No. 15/920,616.
Notice of Allowance dated May 29, 2019 in U.S. Appl No. 15/900,160.
Notice of Allowance dated May 29, 2019 in U.S. Appl No. 15/900,334.
Notice of Allowance dated May 30, 2019 in U.S. Appl No. 15/900,230.
Office Action dated Jun. 10, 2019 in U.S. Appl No. 15/920,518.
Office Action dated Jun. 6, 2019 in U.S. Appl No. 15/899,587.
Office Action dated May 23, 2019 in U.S. Appl No. 15/388,911.
Notice of Allowance dated Jun. 25, 2019 in U.S. Appl No. 15/620,916.
Office Action dated Jun. 25, 2019 in Japanese Application No. 2015-245144.
Notice of Allowance dated Jun. 27, 2019 in U.S. Appl No. 15/854,439.
Notice of Allowance dated Jul. 16, 2019 in U.S. Appl No. 15/900,144.
Office Action dated Jul. 16, 2019 in Japanese Application No. 2016-124933.
U.S. Appl No. 15/218,190, Patented as U.S. Appl. No. 9,721,606.
U.S. Appl No. 15/422,821 (the present Application), Allowed.
U.S. Appl No. 15/422,944, Patented as U.S. Pat. No. 10,347,279.
U.S. Appl No. 15/624,897, Allowed.
U.S. Appl No. 15/624,792, Allowed.
U.S. Appl No. 15/626,832, Allowed.
U.S. Appl No. 15/614,876, Allowed.
U.S. Appl No. 15/620,916, Allowed.
U.S. Appl No. 15/621,464, Allowed.
U.S. Appl No. 15/626,720, Patented as U.S. Pat. No. 10,347,280.
U.S. Appl No. 15/854,383, Allowed.
U.S. Appl No. 15/854,439, Allowed.
U.S. Appl No. 15/848,173, Allowed; QPIDS filed.
U.S. Appl No. 15/628,814, Allowed; RCE filed.
U.S. Appl No. 15/626,355, Allowed; RCE filed.
U.S. Appl No. 15/380,309, Allowed.
U.S. Appl No. 15/241,286, Patented as U.S. Pat. No. 10,026,4331.
U.S. Appl No. 15/854,438, Allowed; QPIDS filed.
U.S. Appl No. 15/854,409, Allowed; QPIDS filed.
U.S. Appl No. 15/920,563, Allowed; QPIDS filed.
U.S. Appl No. 15/900,144, Allowed.
U.S. Appl No. 15/900,080, Allowed.
U.S. Appl No. 15/900,230, Allowed.
U.S. Appl No. 15/900,164, Allowed.
U.S. Appl No. 15/899,430, Allowed.
U.S. Appl No. 15/920,515, Allowed.
U.S. Appl No. 15/920,517, Allowed.
U.S. Appl No. 15/920,538, Allowed.
U.S. Appl No. 15/920,544, Allowed.
U.S. Appl No. 15/920,768, Allowed; QPIDS filed.
U.S. Appl No. 16/100,289, Allowed; RCE filed.
U.S. Appl No. 15/900,106, Allowed.
U.S. Appl No. 15/900,141, Allowed.
U.S. Appl No. 15/900,160, Allowed.
U.S. Appl No. 15/900,345, Allowed.
U.S. Appl No. 15/900,379, Allowed.
U.S. Appl No. 15/920,616, Allowed.
U.S. Appl No. 15/900,242, Allowed.
U.S. Appl No. 15/900,334, Allowed.
U.S. Appl No. 15/920,592, Allowed.
U.S. Appl No. 16/160,377, Allowed.
U.S. Appl No. 16/142,560, Pending.
U.S. Appl No. 16/184,312, Allowed.
U.S. Appl No. 16/143,646, Allowed; RCE filed.
U.S. Appl No. 16/144,428, Pending.
U.S. Appl No. 16/143,747, Pending.
U.S. Appl No. 16/440,161, Pending.
U.S. Appl No. 16/144,605, Pending.
Notice of Allowance dated Jul. 31, 2019 in U.S. Appl No. 16/100,289.
Notice of Allowance dated Jul. 31, 2019 in U.S. Appl No. 16/143,646.
Office Action dated Aug. 23, 2019 in U.S. Appl No. 15/854,409.
Office Action dated Aug. 27, 2019 in Japanese Application No. 2016-254428.
Office Action dated Aug. 27, 2019 in Japanese Application No. 2016-254430.
Office Action dated Aug. 6, 2019 in Japanese Application No. 2016-254421.
Office Action dated Aug. 6, 2019 in Japanese Application No. 2016-254427.
Office Action dated Apr. 23, 2019 in Japanese Application No. 2016-169851.
Office Action dated Apr. 23, 2019 in Japanese Application No. 2016-182230.
Notice of Allowance dated Apr. 16, 2019 in U.S. Appl No. 15/625,428.
Notice of Allowance dated Mar. 13, 2019 in U.S. Appl No. 16/100,289.
Notice of Allowance dated Mar. 18, 2019 in U.S. Appl No. 15/626,355.
Notice of Allowance dated Mar. 18, 2019 in U.S. Appl No. 15/628,814.
Office Action dated Feb. 5, 2019 in U.S. Appl No. 16/038,339.
Office Action dated Mar. 15, 2019 in U.S. Appl No. 15/280,195.
Office Action dated Mar. 15, 2019 in U.S. Appl No. 15/619,012.
Office Action dated Mar. 15, 2019 in U.S. Appl No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
"Introduction to TMR Magnetic Sensors", Anonymous, Mar. 12, 2015, MR Sensor Technology, pp. 1-5 (Year: 2015).
Notice of Allowance dated Mar. 5, 2019 in U.S. Appl. No. 16/009,603.
Office Action dated Feb. 26, 2019 in Japanese Application No. 2016-123207.
Office Action dated Mar. 6, 2019 in U.S. Appl. No. 15/854,403.
Office Action dated Feb. 28, 2019 in U.S. Appl. No. 15/920,518.
Office Action dated Apr. 15, 2019 in U.S. Appl. No. 16/182,083.
Office Action dated Apr. 16, 2019 in U.S. Appl. No. 16/232,165.
Office Action dated Mar. 5, 2019 in U.S. Appl. No. 15/443,026.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821 (the present Application), Pending.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.

(56) References Cited

OTHER PUBLICATIONS

U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,383, Pending.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Pending.
U.S. Appl. No. 15/388,864 Patented as U.S. Pat. No. 9,773,519.
U.S. Appl. No. 15/072,550 Patented as U.S. Pat. No. 9,704,525.
U.S. Appl. No. 15/615,871, Patented as U.S. Pat. No. 10,074,393.
U.S. Appl. No. 15/854,410 Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Pending.
U.S. Appl. No. 15/920,518, Pending.
U.S. Appl. No. 15/899,587, Pending.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Pending.
U.S. Appl. No. 15/900,412, Patented as U.S. Pat. No. 10,062,403.
U.S. Appl. No. 15/900,141, Pending.
U.S. Appl. No. 15/900,160, Pending.
U.S. Appl. No. 15/900,345, Pending.
U.S. Appl. No. 15/900,379, Pending.
U.S. Appl. No. 16/012,018, Pending.
U.S. Appl. No. 15/920,616, Pending.
U.S. Appl. No. 15/900,242, Pending.
U.S. Appl. No. 15/900,334, Pending.
U.S. Appl. No. 15/920,592, Pending.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.

* cited by examiner

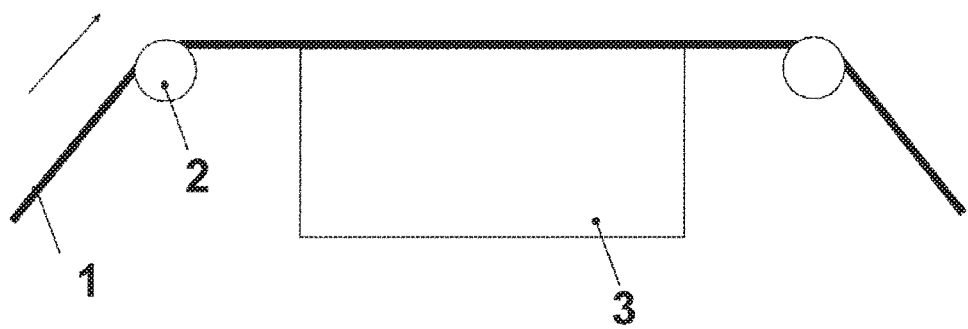

US 10,475,481 B2

MAGNETIC TAPE HAVING CHARACTERIZED BACKCOAT LAYER AND METHOD OF MANUFACTURING THE SAME

CROSS-REFERENCE TO RELATED APPLICATIONS

This application claims priority under 35 U.S.C 119 to Japanese Patent Application No. 2016-018821 filed on Feb. 3, 2016. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes.

Japanese Unexamined Patent Publication (KOKAI) No. 2004-5820, which is expressly incorporated herein by reference in its entirety, discloses a magnetic tape having a backcoat layer (referred to in Japanese Unexamined Patent Publication (KOKAI) No. 2004-5820 as a "back layer") on the opposite side of the nonmagnetic support from the side on which the magnetic layer is present.

SUMMARY OF THE INVENTION

Examples of characteristics that are demanded of magnetic tapes are high electromagnetic characteristics and low dropout.

One effective way to enhance the electromagnetic characteristics is to increase the smoothness of the magnetic tape surface (surface on the magnetic layer side).

Dropout refers to signal read failures. The occurrence of dropout ends up increasing the error rate, and thus reduction of dropout is desirable. The dropout may cause "transfer" (also referred to as "reverse transfer") that is described in Japanese Unexamined Patent Publication (KOKAI) No. 2004-5820, paragraph 0002. In this regard, Japanese Unexamined Patent Publication (KOKAI) No. 2004-5820 studies controlling the presence of protrusions on the surface on the backcoat layer side (referred to as the "back layer surface" in Japanese Unexamined Patent Publication (KOKAI) No. 2004-5820). Reverse transfer is a phenomenon whereby coarse protrusions present on the backcoat layer bite into the surface on the magnetic layer side, causing indentations to form on the surface on the magnetic layer side. Thus, this phenomenon can be inhibited by increasing the smoothness of the surface on the backcoat layer side of the magnetic tape.

However, when the smoothness of the surface on the backcoat layer side is increased, the edges of the magnetic tape tend to be damaged (referred to as "edge damage" hereinafter) after being run in a drive. This will be described further. Recording and reproducing a signal on a magnetic tape are conducted by setting a magnetic tape cartridge housing a magnetic tape in a drive and running the magnetic tape within the magnetic tape cartridge. The magnetic tape is housed within the magnetic cartridge by being wound up on a reel. Thus, during running, the magnetic tape is fed out from and wound up on the reel. When misalignment occurs during this winding, the edge of the magnetic tape strikes the flange and the like of the reel, and edge damage ends up occurring. This edge damage can cause an increase in errors during recording and a drop in running stability. Accordingly, it is desirable to inhibit edge damage by inhibiting winding misalignment in addition to decreasing dropout and enhancing the electromagnetic characteristics.

An aspect of the present invention provides for a magnetic tape that can exhibit good electromagnetic characteristics and make it possible to inhibit dropout and edge damage.

An aspect of the present invention relates to:

A magnetic tape having, on one surface of a nonmagnetic support, a magnetic layer containing ferromagnetic powder and binder, and on the other surface thereof, a backcoat layer containing nonmagnetic powder and binder, wherein:

the centerline average surface roughness Ra on the surface on the magnetic layer side of the magnetic tape is less than or equal to 1.8 nm;

the coefficient of friction measured on the base portion of the surface on the magnetic layer side of the magnetic tape is less than or equal to 0.35;

the centerline average surface roughness Ra measured on the surface on the backcoat layer side of the magnetic tape is less than or equal to 5.0 nm;

the backcoat layer contains a fatty acid ester;

the full width at half maximum of the spacing distribution measured by optical interferometry on the surface on the backcoat layer side of the magnetic tape before vacuum heating the magnetic tape is greater than 0 nm but less than or equal to 10.0 nm;

the full width at half maximum of the spacing distribution measured by optical interferometry on the surface on the backcoat layer side of the magnetic tape after vacuum heating the magnetic tape is greater than 0 nm but less than or equal to 10.0 nm; and the difference ($S_{after} - S_{before}$) between the spacing $S_{after}$ measured by optical interferometry on the surface on the backcoat layer side of the magnetic tape after vacuum heating the magnetic tape and the spacing $S_{before}$ measured by optical interferometry on the surface on the backcoat layer side of the magnetic tape before vacuum heating the magnetic tape is greater than 0 nm but less than or equal to 8.0 nm.

The above magnetic tape can exhibit good electromagnetic characteristics, permit the reading of signals with little dropout, and can be run with little edge damage. The presumptions of the present inventors in this regard are set forth further below.

The centerline average surface roughness Ra as measured on the surface on the magnetic layer side or the backcoat layer side of the magnetic tape as referred to in the present invention and the present specification refers to the centerline average surface roughness Ra as measured in a region with an area of 40 μm×40 μm on the surface on the magnetic layer side or the backcoat layer side of the magnetic tape by an atomic force microscope (AFM). An example of the measurement condition is as follows. The values of the centerline average surface roughness Ra shown in Examples further below are those measured under the following condition.

AFM (Nanoscope 4 made by Veeco) is employed at a scan rate (probe displacement rate) of 40 μm/sec. and a resolution of 512 pixels×512 pixels to measure the centerline average surface roughness Ra in a region with an area of 40 μm×40 μm on the surface on the magnetic layer side or the backcoat layer side of the magnetic tape.

The "base portion" as referred to in the present invention and the present specification is the portion of the surface on the magnetic layer side of the magnetic tape specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 μm length in the longitudinal direction of a magnetic tape), a spherical indenter made of diamond that is 1 μm in radius is passed back and forth once at a load of 100 μN and at a speed of 1 μm/sec. to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The μ value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction μ value is conducted for three portions of the base portion randomly determined on the surface of the magnetic layer and the arithmetic average of the three measured values obtained is adopted as the coefficient of friction measured on the base portion. The coefficient of friction measured on the base portion will also be referred to as the "base portion friction" below.

In the present invention and present specification, the "vacuum heating" of a magnetic tape is conducted by maintaining the magnetic tape for 24 hours in an environment of an atmospheric temperature of 70° C. to 90° C. and a pressure of greater than or equal to 200 Pa but less than or equal to 0.01 MPa.

In the present invention and present specification, the spacing that is measured by optical interferometry on the surface on the backcoat layer side of the magnetic tape is a value measured by the following method.

A magnetic tape and a transparent, sheet-shaped member (such as a sheet of glass) are superposed with the surface on the backcoat layer side of the magnetic tape facing the transparent sheet-shaped member. In this state, a pressing member is caused to apply a pressure of $5.05 \times 10^4$ N/m (0.5 atm) to the sheet-shaped member from the side opposite to the side at which the sheet-shaped member faces with the surface on the backcoat layer side of the magnetic tape. In this state, light is irradiated onto the surface on the backcoat layer side of the magnetic tape through the transparent sheet-shaped member (scope of irradiation: 150,000 to 200,000 μm$^2$). The spacing (distance) between the surface on the backcoat layer side of the magnetic tape and the surface of the transparent sheet-shaped member is obtained based on the strength of the interfering light (for example, the contrast in an interference fringe image) generated by the difference in the optical paths of the light reflecting off the surface on the backcoat layer side of the magnetic tape and the light reflecting off the surface of the transparent sheet-shaped member on the magnetic tape side. The light that is irradiated is not specifically limited. When the light that is irradiated is light having emission wavelengths over a relatively broad range of wavelengths, such as white light containing multiple wavelengths, a member having the function of selectively cutting light of a specific wavelength or light outside a specific wavelength range, such as an interference filter, is disposed between the transparent sheet-shaped member and the light-receiving element receiving reflected light, and light of some portion of the wavelength or portion of the wavelength range of the reflected light is selectively caused to enter the light-receiving element. When the light that is irradiated is light having a single emission peak (so-called "monochromic light"), this member need not be employed. The wavelength of the light caused to enter the light-receiving element, for example, falls within a range of 500 nm to 700 nm, but is not specifically limited. It suffices for the transparent sheet-shaped member to be a member having a transparence such that it passes the light that is irradiated to a degree making it possible to irradiate the magnetic tape through the member and obtain interfering light.

The above measurement can be conducted with a commercial tape spacing analyzer (TSA) made by Micro Physics Corp., for example. The spacing measurement in Examples was conducted with a tape spacing analyzer made by Micro Physics Corp.

The "full width at half maximum" of the spacing distribution in the present invention and present specification refers to the full width at half maximum (FWHM) when the interference fringe image obtained by the above spacing measurement is separated into 300,000 points, the spacing of each point (the distance between the surface on the backcoat layer side of the magnetic tape and the surface of the sheet-shaped member on the magnetic tape side) is determined, the values are used to plot a histogram, and the histogram is fit to a Gaussian distribution.

The difference ($S_{after} - S_{before}$) refers to a value obtained by subtracting the most frequent value before vacuum heating from the most frequent value after vacuum heating at the above 300,000 points.

In one embodiment, the centerline average surface roughness Ra measured on the surface on the magnetic layer side is greater than or equal to 1.2 nm but less than or equal to 1.8 nm.

In one embodiment, the centerline average surface roughness Ra measured on the surface of the backcoat layer is greater than or equal to 1.5 nm but less than or equal to 5.0 nm.

In one embodiment, the full width at half maximum of the spacing distribution measured by optical interferometry on the surface on the backcoat layer side of the magnetic tape before vacuum heating the magnetic tape falls within a range of 1.0 nm to 8.0 nm.

In one embodiment, the full width at half maximum of the spacing distribution measured by optical interferometry on the surface on the backcoat layer side of the magnetic tape after vacuum heating the magnetic tape falls within a range of 1.0 nm to 8.0 nm.

In one embodiment, the difference ($S_{after} - S_{before}$) falls within a range of 1.0 nm to 7.0 nm.

In one embodiment, the base portion friction falls within a range of 0.15 to 0.30.

In one embodiment, the nonmagnetic powder contained in the backcoat layer is one or more types of nonmagnetic powder selected from the group consisting of inorganic powder and carbon black.

In one embodiment, the ratio accounted for by inorganic powder falls within a range of 50.0 weight parts to 100.0 weight parts per 100.0 weight parts of the total quantity of nonmagnetic powder in the backcoat layer.

A further aspect of the present invention relates to a method of manufacturing a magnetic tape including:

coating and drying a backcoat layer-forming composition containing nonmagnetic powder, binder, and a fatty acid ester on one surface of a nonmagnetic support to form a coating layer; and applying vibration to the coating layer that has been formed to form a backcoat layer.

In one embodiment, the vibration is ultrasonic vibration.

An aspect of the present invention can provide a magnetic tape exhibiting good electromagnetic characteristics, in which dropout and edge damage are inhibited.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein:

FIG. 1 is a schematic drawing of vibration-imparting device employed in Examples.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape according to one aspect of the present invention is a magnetic tape having, on one surface of a nonmagnetic support, a magnetic layer containing ferromagnetic powder and binder, and on the other surface thereof, a backcoat layer containing nonmagnetic powder and binder, wherein:

the centerline average surface roughness Ra (also referred to simply as the "Ra on the magnetic layer side" hereinafter) on the surface on the magnetic layer side of the magnetic tape is less than or equal to 1.8 nm;

the coefficient of friction (base portion friction) measured on the base portion of the surface on the magnetic layer side of the magnetic tape is less than or equal to 0.35; the centerline average surface roughness Ra (also referred to simply as the "Ra on the backcoat layer side" hereinafter) measured on the surface on the backcoat layer side of the magnetic tape is less than or equal to 5.0 nm;

the backcoat layer contains a fatty acid ester;

the full width at half maximum (also referred to hereinafter as the "$FWHM_{before}$") of the spacing distribution measured by optical interferometry on the surface on the backcoat layer side of the magnetic tape before vacuum heating the magnetic tape is greater than 0 nm but less than or equal to 10.0 nm;

the full width at half maximum (also referred to hereinafter as the "$FWHM_{after}$") of the spacing distribution measured by optical interferometry on the surface on the backcoat layer side of the magnetic tape after vacuum heating the magnetic tape is greater than 0 nm but less than or equal to 10.0 nm; and the difference ($S_{after}-S_{before}$) between the spacing $S_{after}$ measured by optical interferometry on the surface on the backcoat layer side of the magnetic tape after vacuum heating the magnetic tape and the spacing $S_{before}$ measured by optical interferometry on the surface on the backcoat layer side of the magnetic tape before vacuum heating the magnetic tape is greater than 0 nm but less than or equal to 8.0 nm.

The surface on the magnetic layer side of the magnetic tape will also be referred to as the magnetic layer side surface hereinafter. The surface on the backcoat layer side of the magnetic tape will also be referred to as the backcoat layer side surface hereinafter.

The present inventors presume (1) to (3) below regarding the above magnetic tape.

(1) The above magnetic tape has a centerline average surface roughness Ra measured on the surface on the magnetic layer side of less than or equal to 1.8 nm. By having such a smooth surface on the magnetic layer side, the magnetic tape can exhibit good electromagnetic characteristics.

(2) The magnetic tape has a centerline average surface roughness Ra measured on the surface on the backcoat layer side of less than or equal to 5.0 nm. Having such a smooth surface on the backcoat layer side can inhibit the occurrence of dropout. Having a smooth surface on the backcoat layer side is presumed to inhibit the occurrence of reverse transfer.

(3) However, having a smooth surface on the backcoat layer side may cause winding misalignment during winding of the magnetic tape, which tends to produce edge damage. The details are as set forth above. However, although the above magnetic tape has a smooth surface on the backcoat layer side (specifically, the centerline average surface roughness Ra measured on the surface on the backcoat layer side is less than or equal to 5.0 nm), the occurrence of edge damage can be inhibited. In this regard, the present inventors presume that having the above base portion friction, $FWHM_{before}$, $FWHM_{after}$, and difference ($S_{after}-S_{before}$) fall within the ranges set forth above can contribute to inhibiting the occurrence of edge damage. The details are as set forth below.

The backcoat layer of the above magnetic tape contains a fatty acid ester. The fatty acid ester is a component that can function as a lubricant in the magnetic tape. Lubricants can be broadly divided into fluid lubricants and boundary lubricants. Fluid lubricants can function as lubricants by forming a liquid film on the surface of the magnetic tape. Fatty acid esters are generally classified as fluid lubricants. Accordingly, a liquid film of fatty acid ester is presumed to be present on the surface of the magnetic tape on the backcoat layer side.

Additionally, the present inventors presume with regard to winding misalignment that as the surface on the backcoat layer side comes into contact with the surface on the magnetic layer side in the course of the magnetic tape being wound on the reel, the action of a force between the two surfaces that draws the two surfaces together contributes to inhibiting winding misalignment. It is presumed that the force (meniscus force) imparted by the meniscus (liquid bridge) of the liquid film of fatty acid ester on the surface of the magnetic tape on the backcoat layer side works to draw the two surfaces together. The present inventors presume that the base portion friction, $FWHM_{before}$, $FWHM_{after}$, and difference ($S_{after}-S_{before}$) can contribute to controlling the meniscus force in the manner set forth below.

As regards the base portion friction, the reason that protrusions with a height of greater than or equal to 15 nm from the reference plane are defined as protrusions in the above method of measuring the base portion friction is that the protrusions that are normally identified as protrusions present on the surface on the magnetic layer side are mainly protrusions that are greater than or equal to 15 nm in height from the reference plane. These protrusions can be formed on the surface on the magnetic layer side with nonmagnetic powder such as an abrasive, for example. By contrast, the present inventors presume that irregularities even more microscopic than the irregularities due to such protrusions are present on the surface on the magnetic layer side. The present inventors presume that the base portion friction can be adjusted by controlling the shape of these microscopic irregularities. For example, they presume that the value of the base portion friction can be decreased by increasing the presence of protrusions of such microscopic irregularities. However, increasing the presence of such protrusions increases the specific surface area of the base portion. On the surface of the magnetic layer side with a base portion friction of less than or equal to 0.35, the fact that the specific surface area of the base portion is greater than that of a surface with a base portion friction exceeding this range is presumed to tend to cause the fatty acid ester that is present on the surface on the backcoat layer side to physically adsorb to the surface on the magnetic layer side in the course of contact between the surface on the backcoat layer side and the surface on the magnetic layer side. The present inventors presume that this contributes to increasing the meniscus force.

Additionally, the fatty acid ester is a component that has a property of volatilizing with vacuum heating. The present inventors have focused on this point, and presume that on the surface on the backcoat layer side of the magnetic tape, the spacing difference ($S_{after}-S_{before}$) after vacuum heating (the state in which the liquid film formed by the fatty acid ester has been removed by volatilization) and before vacuum heating (the state in which the liquid film formed by the fatty acid ester is present) is a value serving as an indicator of the thickness of the liquid film of fatty acid ester on the surface on the backcoat layer side. When this value is greater than 0 nm, that is, when a liquid film of fatty acid ester is present on the surface on the backcoat layer side, it is presumed to contribute to causing the meniscus force to have an effect. However, when an excessive quantity of fatty acid ester is present on the surface on the backcoat layer side, the meniscus force produces an excessive effect, which is presumed to cause sticking of the surface on the backcoat layer side to the surface on the magnetic layer side. The present inventors presume that having a liquid film of fatty acid ester present on the surface on the backcoat layer side such that the difference ($S_{after}-S_{before}$) is greater than 0 nm but less than or equal to 8.0 nm can contribute to generating a force acting between the two surfaces to pull the surface on the backcoat layer side and the surface on the magnetic layer side together while inhibiting the occurrence of sticking.

The fact that the full width at half maximum of the spacing distribution measured by optical interferometry on the surface on the backcoat layer side before and after vacuum heating the magnetic tape, $FWHM_{before}$ and $FWHM_{after}$, are greater than 0 nm but less than or equal to 10.0 nm, respectively, is presumed by the present inventors to contribute to inhibiting the occurrence of edge damage. The lower the value of the full width at half maximum of the spacing distribution measured on the surface on the backcoat layer side, the less variation in the spacing value measured on various parts of the surface on the backcoat layer side of the magnetic tape that is indicated. In this regard, the causes of variation in the value of the spacing measured on the surface on the backcoat layer side are presumed to be a variation in the surface shape of the backcoat layer of the magnetic tape itself (such as variation due to the state of dispersion of the nonmagnetic powder contained in the backcoat layer) and variation in the thickness of the liquid film of fatty acid ester. The present inventors presume that, the spacing distribution $FWHM_{before}$ measured before vacuum heating, that is, in a state where a liquid film of fatty acid ester is present on the surface on the backcoat layer side of the magnetic tape, increases with variation in the thickness of the liquid film of fatty acid ester and with variation in the surface shape of the backcoat layer itself, and variation in the thickness of the liquid film of fatty acid ester produces the greater effect. By contrast, the spacing distribution $FWHM_{after}$ measured after vacuum heating, that is, in a state where the liquid film of fatty acid ester has been removed from the surface on the backcoat layer side of the magnetic tape, is presumed by the present inventors to increase with variation in the surface shape of the backcoat layer itself. The present inventors presume that having a difference ($S_{after}-S_{before}$) falling within the range set forth above and having full width half maximum values of spacing distribution before and after vacuum heating that fall within the ranges set forth above on the surface on the backcoat layer side can contribute to producing a meniscus force adequate to inhibit winding misalignment between the surface on the backcoat layer side and the surface on the magnetic layer side.

However, the above are merely presumptions by the present inventors and are not intended to limit the present invention in any way.

The above magnetic tape will be described in greater detail below.

[Ra on the Magnetic Layer Side]

The centerline average surface roughness Ra (Ra on the magnetic layer side) measured on the surface on the magnetic layer side of the magnetic tape is less than or equal to 1.8 nm. Thus, the magnetic tape can exhibit good electromagnetic characteristics. From the perspective of further enhancing the electromagnetic characteristics, the Ra on the magnetic layer side is desirably less than or equal to 1.7 nm, preferably less than or equal to 1.6 nm, and more preferably, less than or equal to 1.5 nm. The Ra on the magnetic layer side is, for example, greater than or equal to 1.2 nm. However, from the perspective of enhancing the electromagnetic characteristics, the lower the Ra on magnetic layer side, the better. Thus, it can fall below these values that have been given by way of example.

The Ra on the magnetic layer side can be controlled by known methods. For example, the Ra on the magnetic layer side can be varied by the size of the various powders (such as ferromagnetic powder and nonmagnetic powder that can be optionally incorporated into the magnetic layer) contained in the magnetic layer, the manufacturing conditions of the magnetic tape, and the like. Thus, these can be adjusted to obtain a magnetic tape with an Ra on the magnetic layer side of less than or equal to 1.8 nm.

[Base Portion Friction]

The coefficient of friction (base portion friction) measured on the base portion of the surface on the magnetic layer side of the above magnetic tape is less than or equal to 0.35. As set forth above, the present inventors presume that having a base portion friction of less than or equal to 0.35 can contribute to inhibiting the occurrence of edge damage. From the perspective of further inhibiting the occurrence of edge damage, the base portion friction is desirably less than or equal to 0.33, preferably less than or equal to 0.30. By way of example, the base portion friction can be greater than or equal to 0.10, greater than or equal to 0.15, or greater than or equal to 0.20. However, from the perspective of diminishing edge damage, the lower, the better. Thus, it can fall below these values given by way of example.

The reason protrusions protruding to a height of greater than or equal to 15 nm from a reference plane are defined as the protrusions in the method of measuring the base portion friction is that normally the protrusions identified as protrusions present on the surface on the magnetic layer side are protrusions that protrude to a height of greater than or equal to 15 nm from the reference plane. Such protrusions can be formed, by example, on the surface on the magnetic layer side by nonmagnetic powder such as abrasive. By contrast, the present inventors presume that irregularities more microscopic than the irregularities formed by such protrusions are present on the surface on the magnetic layer side. The present inventors presume that the base portion friction can be adjusted by controlling the shape of these microscopic irregularities. Based on this presumption, the present inventors formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventor presumes that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventors formed a magnetic layer using additional nonmagnetic powder with an average particle size greater than that of the ferromagnetic powder together with the nonmagnetic powder, such as abrasive, capable of forming protrusions having a height of greater than or equal to 15 nm from the reference surface on the surface of the magnetic layer to control the shape of irregularities on the base portion. It was thus possible to control the base portion friction to various values. Accordingly, another example of a way of adjusting the base portion friction is to use this additional nonmagnetic powder when forming the magnetic layer. More specifically, the present inventor presumes that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

[Ra on the Backcoat Layer Side]

The centerline average surface roughness Ra (Ra on the backcoat layer side) measured on the surface on the backcoat layer side of the magnetic tape is less than or equal to 5.0 nm. This can inhibit the occurrence of dropout. From the perspective of further inhibiting the occurrence of dropout, the Ra on the backcoat layer side is desirably less than or equal to 4.5 nm, preferably less than or equal to 4.0 nm, more preferably less than or equal to 3.5 nm, and still more preferably, less than or equal to 3.0 nm. The Ra on the backcoat layer side is, for example, greater than or equal to 1.5 nm, or greater than or equal to 1.8 nm. From the perspective of reducing reverse transfer to inhibit the occurrence of dropout, the lower the Ra on the backcoat layer side, the better. Thus, the Ra on the backcoat layer side can fall below the values given by way of example above.

The Ra on the backcoat layer side can be controlled by known methods. For example, the Ra on the backcoat layer side can be varied by the size of the various powders (such as inorganic powder and carbon black) contained in the backcoat layer, the manufacturing conditions of the magnetic tape, and the like. Thus, these can be adjusted to obtain a magnetic tape with an Ra on the backcoat layer side of less than or equal to 5.0 nm.

[Full Width at Half Maximum of the Spacing Distribution $FWHM_{before}$ and $FWHM_{after}$]

The full width at half maximum of the spacing distribution before vacuum heating $FWHM_{before}$ and full width at half maximum of the spacing distribution $FWHM_{after}$ after vacuum heating that are measured on the surface on the backcoat layer side of the magnetic tape are both greater than 0 nm but less than or equal to 10.0 nm. As set forth above, the present inventors presume that keeping the $FWHM_{before}$ and $FWHM_{after}$ to within this range can contribute to inhibiting the occurrence of edge damage. From the perspective of further inhibiting the occurrence of edge damage, the $FWHM_{before}$ and $FWHM_{after}$ are desirably less than or equal to 9.0 nm, preferably less than or equal to 8.0 nm, more preferably less than or equal to 7.0 nm, and still more preferably, less than or equal to 6.0 nm. For example, the $FWHM_{before}$ and $FWHM_{after}$ can be greater than or equal to 1.0 nm. However, the lower the value, the better. Thus, it can fall below the values given by way of example above.

The full width at half maximum of the spacing distribution before vacuum heating $FWHM_{before}$ can be primarily reduced by reducing the variation in thickness of the liquid film of fatty acid ester. Examples of specific means of achieving this are given further below. The full width at half maximum of the spacing distribution after vacuum heating $FWHM_{after}$ can be primarily reduced by reducing variation in the shape of the surface on the backcoat layer side. Thus, increasing dispersion of the nonmagnetic powder in the backcoat layer-forming composition is desirable. The dispersion can be adjusted, for example, by means of the type of nonmagnetic powder employed to form the backcoat layer and the blending ratio of nonmagnetic powders when two or more are incorporated. Examples of specific means of achieving this are given further below.

[Difference $(S_{after}-S_{before})$]

The difference of the spacing before and after vacuum heating $(S_{after}-S_{before})$ measured on the surface on the backcoat layer side of the magnetic tape is greater than 0 nm but less than or equal to 8.0 nm. This can inhibit the occurrence of edge damage while inhibiting the occurrence of sticking of the surface on the backcoat layer side and the surface on the magnetic layer side. From the perspective of further inhibiting the occurrence of edge damage, the difference $(S_{after}-S_{before})$ is desirably greater than or equal to 0.1 nm, preferably greater than or equal to 1.0 nm. From the same perspective, the difference $(S_{after}-S_{before})$ is desirably less than or equal to 7.0 nm, preferably less than or equal to 6.0 nm, and more preferably, less than or equal to 5.0 nm. The difference $(S_{after}-S_{before})$ can be controlled through the quantity of fatty acid ester added to the backcoat layer-forming composition. The difference $(S_{after}-S_{before})$ tends to increase with the quantity of fatty acid ester that is added to the backcoat layer-forming composition.

The magnetic layer, backcoat layer, nonmagnetic support, and optionally incorporated nonmagnetic layer of the above magnetic tape will be further described below.

<Magnetic Layer>

(Ferromagnetic Powder)

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

The specific embodiment of adjustment with the ferromagnetic powder is forming the magnetic layer with two or more different kinds of ferromagnetic powder differing average particle size. In this case, from the perspective of enhancing the recording density of the magnetic tape, it is desirable to employ ferromagnetic powder with a small average particle size as the ferromagnetic powder employed in the greatest proportion in the magnetic layer among two or more different kinds of ferromagnetic powder. From this perspective, when employing ferromagnetic powder in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably greater than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)–(average particle size of the former)", desirably falls within a range of 10 nm to 80 nm, preferably falls within a range of 10 nm to 50 nm, more preferably falls within a range of 10 nm to 40 nm, and still more preferably, falls within a range of 12 nm to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

The term "ferromagnetic powders of differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders of differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the first ferromagnetic powder with an average particle size of 10 nm to 50 nm, for example, in the greatest proportion, a maximum peak will normally be found within the particle size range of 10 nm to 50 nm in the particle size distribution curve.

A portion of the above additional ferromagnetic powder can be replaced with nonmagnetic powder, described further below.

The average particle size of the ferromagnetic powder in the present invention and specification is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss. In the present invention and present specification, the term "powder" means a collection of multiple particles. For example, the term "ferromagnetic powder" means a collection of multiple ferromagnetic particles. The term "collection" is not limited to forms in which the constituent particles are in direct contact, but also includes forms in which binder, additives, or the like are present between the particles. The term "particles" is also sometimes employed to denote powder.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and specification, the size of the particles constituting powder such as ferromagnetic powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (for example, average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (for example, average major axis length), from the perspective of achieving higher density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both.

The content (fill rate) of ferromagnetic powder in the magnetic layer desirably falls within a range of 50 to 90 weight percent, preferably within a range of 60 to 90 weight percent. A high fill rate is desirable from the perspective of raising the recording density.

<Binder, Curing Agent>

The above magnetic tape is a particulate magnetic tape that contains binder along with ferromagnetic powder in the magnetic layer. For example, polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0028 to 0031 of Japanese Unexamined Patent Publication (KOKAI) No. 2010-24113, which is expressly incorporated herein by reference in its entirety, with regard to the above binders. A curing agent can be employed with the above resin suitable for use as the binder. As a curing agent, polyisocyanate is desirable. For details relating to polyisocyanate, reference can be made to Japanese Unexamined Patent Publication (KOKAI) No. 2011-216149, paragraphs 0124 and 0125. The content of curing agent in the magnetic layer-forming composition is, for example, 0 to 80.0 weight parts, and from the perspective of enhancing the coating strength, desirably falls within a range of 50.0 to 80.0 weight parts, per 100.0 weight parts of binder.

<Additives>

Additives can be added as needed to the magnetic layer. Examples of additives are nonmagnetic powder, lubricants, dispersing agents, dispersion adjuvants, antifungal agents, antistatic agents, oxidation inhibitors, and carbon black. Commercial products can be suitably selected based on the properties desired for use as additives.

One or more kinds of nonmagnetic powder are desirably contained in the magnetic layer. An example of the nonmagnetic powder is nonmagnetic powder that is capable of functioning as a protrusion-forming agent forming protrusions that suitably protrude from the surface on the magnetic layer side (referred to as a "protrusion-forming agent" hereinafter). The protrusion forming agent is a component that can contribute to controlling the friction characteristics of the surface on the magnetic layer side of the magnetic tape. Nonmagnetic powder capable of functioning as an abrasive (referred to as an "abrasive" hereinafter) can also be contained in the magnetic layer. At least a protrusion-forming agent or an abrasive, or both, are desirably contained in the magnetic layer of the magnetic tape.

The various kinds of nonmagnetic powder that are commonly employed as the protrusion-forming agent can be employed as the protrusion forming agent. These can be inorganic materials or organic materials. In one embodiment, from the perspective of achieving uniform friction characteristics, the particle size distribution of the protrusion-forming agent is desirably that of a monodispersion exhibiting a single peak, and not that of a multiple dispersion exhibiting a distribution with multiple peaks. From the perspective of the availability of monodisperse particles, nonmagnetic powder in the form of powder of an inorganic material (inorganic powder) is desirable. Examples of inorganic powder are various powders of metal oxides, metal carbonates, metal sulfates, metal nitrides, metal carbides, and metal sulfides. Inorganic oxide powders are desirable.

The protrusion-forming agent is preferably a colloidal particle, more preferably an inorganic oxide colloidal particle. From the perspective of the availability of monodisperse particles, the inorganic oxide constituting the inorganic oxide colloidal particles is desirably silicon dioxide (silica). The inorganic oxide colloidal particles are preferably colloidal silica (silica colloid particles). In the present invention and present specification, the term "colloidal particles" refers to particles that are capable of dispersing to yield a colloidal dispersion without precipitating, when added in a quantity of 1 g per 100 mL to at least one organic solvent in the form of at least methyl ethyl ketone, cyclohexanone, toluene, or ethyl acetate, or a mixed solvent containing two or more of these solvents in any blending ratio. The average particle size of the colloidal particles is a value that is determined by the method set forth as an average particle diameter measurement method in Japanese Unexamined Patent Publication (KOKAI) No. 2011-048878, paragraph 0015. The content of the above publication is expressly incorporated herein by reference in its entirety. In another embodiment, the protrusion-forming agent is desirably carbon black.

The average particle size of the protrusion-forming agent is, for example, 30 nm to 300 nm, desirably 40 nm to 200 nm.

Examples of abrasives are materials that are commonly employed as abrasives in the magnetic layer in the form of various kinds of powder of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, alumina powders such as α-alumina and silicon carbide powders are desirable. The particle size of the abrasive, using the specific surface area as an indicator of particle size, is, for example, greater than or equal to 14 $m^2/g$, desirably greater than or equal to 16 $m^2/g$, and preferably, greater than or equal to 18 $m^2/g$. The specific surface area of the abrasive is, for example, less than or equal to 40 $m^2/g$. The specific surface area is a value measured for primary particles by the nitrogen adsorption method (also called the Brunauer-Emmett-Teller (BET) single point method). The specific surface area obtained by such a method will also be referred to as the BET specific surface area hereinafter.

From the perspective of the protrusion-forming agent and abrasive properly performing their various functions, the content of the protrusion-forming agent in the magnetic layer is desirably 1.0 to 4.0 weight parts, preferably 1.5 to 3.5 weight parts, per 100.0 weight parts of ferromagnetic powder. The content of abrasive in the magnetic layer is desirably 1.0 to 20.0 weight parts, preferably 3.0 to 15.0 weight parts, and more preferably, 4.0 to 10.0 weight parts, per 100.0 weight parts of ferromagnetic powder.

An example of an additive that can be employed in a magnetic layer containing abrasive is the dispersant for enhancing dispersion of the abrasive in the magnetic layer-forming composition that is described in Japanese Unexamined Patent Publication (KOKAI) No. 2013-131285, paragraphs 0012 to 0022. The content of the above publication is expressly incorporated herein by reference in its entirety. Enhancing dispersion of nonmagnetic powder such as abrasive in the magnetic layer-forming composition is desirable to lower the Ra on the magnetic layer side.

As set forth above, the nonmagnetic powder other than the various kinds of nonmagnetic powder set forth above can be employed to control the base portion friction to less than or equal to 0.35. The nonmagnetic powder with a Mohs hardness of less than or equal to 8 is desirable; any of the various kinds of nonmagnetic powder that are commonly employed in the nonmagnetic layer can be employed. The details are as set forth further below for the nonmagnetic layer. Colcothar (bengara) is an example of a preferred nonmagnetic powder. Colcothar has a Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)–(average particle size of former)", desirably falls within a range of 10 nm to 80 nm, preferably within a range of 10 nm to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

[Nonmagnetic Layer]

The nonmagnetic layer will be described next. The magnetic tape can have a magnetic layer positioned directly on the surface of a nonmagnetic support, or can have a nonmagnetic layer containing nonmagnetic powder and binder between the nonmagnetic support and magnetic layer. The nonmagnetic powder that is employed in the nonmagnetic layer can be an organic or an inorganic material. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Known techniques relating to binders, additives and the like of the nonmagnetic layer can be applied to the nonmagnetic layer. In addition, for example, known techniques relating to magnetic layers can be applied as regards the quantity and type of binder and the quantities and types of additives.

The nonmagnetic layer of the above magnetic tape may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT or a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

<Fatty Acid Ester>

The above magnetic tape has a backcoat layer containing nonmagnetic powder and binder on the Opposite surface of the nonmagnetic support from the surface on which the magnetic layer is present. The backcoat layer contains a fatty acid ester. As set forth above, the present inventors presume that a meniscus force imparted by a liquid film of fatty acid ester on the surface on the backcoat layer side can prevent winding misalignment and thus inhibit the occurrence of edge damage.

A single type of fatty acid ester or two or more types can be incorporated into the backcoat layer. Examples of fatty acid esters are esters of lauric acid, myristic acid, palmitic acid, stearic acid, oleic acid, linoleic acid, linolenic acid, behenic acid, erucic acid, and eraidic acid. Specific examples are butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester in the backcoat layer is, for example, 0.1 to 10.0 weight parts, desirably 1.0 to 5.0 weight parts, per 100.0 weight parts of nonmagnetic powder contained in the backcoat layer. When two or more different fatty acid esters are employed as the fatty acid ester, the content refers to the combined content thereof. In the present invention and the present specification, unless specifically stated otherwise, one or more types of a component can be employed. When two or more types of a component are being employed, unless specifically stated otherwise, the content of the component refers to the combined content of the two or more types of the component.

<Other Lubricants>

The above magnetic tape contains a fatty acid ester, which is one type of lubricant, in the backcoat layer. It can also contain lubricants other than fatty acid esters. Fatty acids, fatty acid amides and the like are an example of lubricants other than fatty acid esters. While fatty acid esters are components that can function as fluid lubricants, fatty acids and fatty acid amides are components that can function as boundary lubricants.

Examples of fatty acids are lauric acid, myristic acid, palmitic acid, stearic acid, oleic acid, linoleic acid, linolenic acid, behenic acid, erucic acid, and eraidic acid. Stearic acid, myristic acid, and palmitic acid are desirable. Stearic acid is preferred. The fatty acid can be contained in the form of a salt such as a metal salt in the backcoat layer.

Examples of fatty acid amides are the amides of the various fatty acids set forth above. Examples are amide laurate, amide myristate, amide palmitate, and amide stearate.

With regard to fatty acids and fatty acid derivatives (such as amides and esters), the fatty acid-derived portion of the fatty acid derivative desirably has a structure that is identical or similar to any fatty acid with which it is employed in combination. For example, when employing a fatty acid in the form of stearic acid, it is desirable to employ a stearic acid ester and/or amide stearate.

The content of fatty acids in the backcoat layer is, for example, 0 to 10.0 weight parts, desirably 0.1 to 10.0 weight parts, and preferably, 1.0 to 7.0 weight parts, per 100.0 weight parts of nonmagnetic powder contained in the backcoat layer. The content of fatty acid amides in the backcoat layer is, for example, 0 to 3.0 weight parts, desirably 0 to 2.0 weight parts, and preferably, 0 to 1.0 weight parts, per 100.0 weight parts of nonmagnetic powder contained in the backcoat layer.

One or more lubricants such as the above-described fatty acid esters, fatty acids, and fatty acid amides can be incorporated into the magnetic layer and/or nonmagnetic layer. The content of fatty acid esters in the magnetic layer is, for example, 0.1 to 10.0 weight parts, desirably 1.0 to 7.0 weight parts, per 100.0 weight parts of ferromagnetic powder. The content of fatty acids in the magnetic layer is, for example, 0 to 10.0 weight parts, desirably 0.1 to 10.0 weight parts, and preferably, 1.0 to 7.0 weight parts, per 100.0 weight parts of ferromagnetic powder. The content of fatty acid amides in the magnetic layer is, for example, 0 to 3.0 weight parts, desirably 0 to 2.0 weight parts, and preferably, 0 to 1.0 weight parts, per 100.0 weight parts of ferromagnetic powder. The contents of the fatty acid esters, fatty acids, and fatty acid amides in the magnetic layer can be applied to those in the nonmagnetic layer by substituting the term "nonmagnetic powder" for the term "ferromagnetic powder" described in relation to the content in the magnetic layer.

<Nonmagnetic Powder>

Reference can be made to the above description relating to the nonmagnetic powder contained in the nonmagnetic layer for the type of nonmagnetic powder contained in the backcoat layer. The nonmagnetic powder that is contained in the backcoat layer is desirably one or more nonmagnetic powders selected from the group consisting of inorganic powder and carbon black. Generally, inorganic powder tends to disperse better in the backcoat layer-forming composition than carbon black. A high degree of dispersion in the backcoat layer-forming composition can contribute to reducing variation in the shape of the surface on the backcoat layer side. Accordingly, one example of a way to adjust the full width at half maximum of the spacing distribution after vacuum heating $FWHM_{after}$, the level of which is thought to decrease with variation in the shape of the surface on the backcoat layer side, is to adjust the type of nonmagnetic powders contained in the backcoat layer and the blending ratio thereof when two or more nonmagnetic powders are incorporated. For example, an inorganic powder is desirably employed as the main nonmagnetic powder of the backcoat layer (the nonmagnetic powder that is contained in the greatest quantity by weight in the nonmagnetic powder). When the nonmagnetic powder contained in the backcoat layer is one or more nonmagnetic powders selected from the group consisting of inorganic powder and carbon black, the proportion accounted for by the inorganic powder desirably falls within a range of more than 50.0 weight parts to 100.0 weight parts, preferably falls within a range of 60.0 weight parts to 100.0 weight parts, more preferably falls within a range of 70.0 weight parts to 100.0 weight parts, and still more preferably, falls within a range of 80.0 weight parts to 100.0 weight parts, per 100.0 weight parts of the total quantity of nonmagnetic powder.

The average particle size of the nonmagnetic powder, for example, falls within a range of 10 nm to 200 nm. The average particle size of the nonmagnetic powder desirably falls within a range of 50 nm to 200 nm, preferably within a range of 80 nm to 150 nm. Additionally, the average particle size of the carbon black desirably falls within a range of 10 nm to 50 nm, and preferably, within a range of 15 nm to 30 nm.

Dispersion of the nonmagnetic powder in the backcoat layer-forming composition can be increased by employing a known dispersing agent, intensifying the dispersion conditions, and the like.

Increasing dispersion of the nonmagnetic powder in the backcoat layer-forming composition is desirable to reduce the Ra on the backcoat layer side.

Desirable forms of methods of adjusting the full width at half maximum of the spacing distribution before vacuum heating $FWHM_{before}$ will be described further below.

Known techniques relating to the formulas of the magnetic layer and/or nonmagnetic layer can be applied to the binder and various optional additives contained in the backcoat layer.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thicknesses of Nonmagnetic Support and Various Layers]

The thickness of the nonmagnetic support and various layers in the above magnetic tape are as follows. The thickness of the nonmagnetic support is, for example, 3.00 µm to 80.00 µm, desirably 3.00 µm to 50.00 µm, and preferably 3.00 µm to 10.00 µm.

From the perspective of high-density recording that is demanded in recent years, the thickness of the magnetic layer is desirably less than or equal to 100 nm. The thickness of the magnetic layer is preferably 10 nm to 100 nm, more preferably 20 nm to 90 nm. The magnetic layer can be comprised of a single layer, or the magnetic layer can be separated into two or more layers with different magnetic characteristics. Known multilayer magnetic layer structures can be applied.

The thickness of the nonmagnetic layer is, for example, 0.10 µm to 1.50 µm, desirably 0.10 µm to 1.00 µm.

The thickness of the backcoat layer is desirably less than or equal to 0.90 µm, preferably 0.10 µm to 0.70 µm.

The thickness of the various layers of the magnetic tape and of the nonmagnetic support can be determined by known film thickness-measuring methods. For example, a cross-section in the direction of thickness of the magnetic tape is exposed by a known method such as an ion beam or a microtome, after which the exposed cross-section is observed with a scanning electron microscope. Various thicknesses, such as the thickness determined in one spot in the direction of thickness while observing the cross-section, or the arithmetic average of the thickness determined in two or more randomly extracted spots—for example, two spots—can be determined. Alternatively, the thickness of each layer can be determined as a design thickness calculated from the manufacturing conditions.

[Manufacturing Method]

<Preparation of the Various Layer-Forming Compositions>

The compositions for forming the magnetic layer, backcoat layer, and optionally provided nonmagnetic layer normally contain solvent in addition to the various components that have been set forth above. The various types of organic solvent that are commonly employed to manufacture particulate magnetic recording media are examples of the solvent. As specific examples, ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide, hexane and the like can be employed in any ratio.

The process of preparing the compositions for forming the various layers, such as the magnetic layer, the backcoat layer and the nonmagnetic layer that is optionally provided, normally includes at least a kneading step, a dispersion step, and mixing steps provided before and after these steps as needed. Each of these steps can be divided into two or more stages. All of the starting materials in the form of ferromagnetic powder, nonmagnetic powder, binder, fatty acid ester, various additives, solvent and the like that are employed in the present invention can be added at the start, or part way through, any of these steps. An individual starting material can be divided for addition in two or more steps. For example, binder can be divided up and added in the kneading step, dispersing step, and in a kneading step after the dispersing step for viscosity adjustment. To manufacture the magnetic tape, conventionally known manufacturing techniques can be employed. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter (bead diameter) and fill rate of these dispersion beads can be optimized for use. A known disperser can be employed.

In one embodiment, in controlling the base portion friction as set forth above, two or more ferromagnetic powders of differing average particle size can be employed to manufacture the magnetic tape. That is, the magnetic layer can be formed using ferromagnetic powders in the form of a first ferromagnetic powder and one or more ferromagnetic powders of greater average particle size than the first ferromagnetic powder. The following embodiments are examples of forms of desirable methods of forming such a magnetic layer. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the method of forming the magnetic layer are as set forth above.

The average particle size of the first ferromagnetic powder can fall within a range of 10 nm to 80 nm.

The difference between the average particle size of the ferromagnetic powder with an average particle size greater than that of the first ferromagnetic powder and the average particle size of the first ferromagnetic powder can fall within a range of 10 nm to 50 nm.

The mixing ratio of the first ferromagnetic powder to the ferromagnetic powder with an average particle size greater than that of the first ferromagnetic powder, by weight, can fall within a range of former:latter=90.0:10.0 to 99.9:0.1.

In another embodiment, the magnetic tape can be manufactured using additional nonmagnetic powder in addition to the abrasive and protrusion-forming agent as nonmagnetic powders in the magnetic layer. That is, the magnetic layer can be formed using the additional nonmagnetic powder described above. The following embodiments are examples of a desirable embodiment of the method of forming such a magnetic layer. A combination of two or more of the following embodiments is a preferred embodiment of the above manufacturing method. Other details regarding the method of forming the magnetic layer are as set forth above.

The average particle size of the additional nonmagnetic powder can be greater than the average particle size of the ferromagnetic powder.

The difference between the average particle size of the ferromagnetic powder and the average particle size of the additional nonmagnetic powder can fall within a range of 10 nm to 80 nm.

The mixing ratio of the ferromagnetic powder and the additional nonmagnetic powder, based on weight, can fall within a range of former:latter=90.0:10.0 to 99.9:0.1.

<Coating Step>

The magnetic layer can be formed by directly coating the magnetic layer-forming composition on the surface of a nonmagnetic support, or by sequentially or simultaneously multilayer coating it along with a nonmagnetic layer-forming composition. The backcoat layer can be formed by coating a backcoat layer-forming composition on the surface on the opposite side of the nonmagnetic support from that on which the magnetic layer is present (or will be subsequently provided). For details regarding coatings to form the various layers, reference can be made to Japanese Unexamined Patent Publication (KOKAI) No. 2010-231843, paragraph 0066. The content of the above publication is expressly incorporated herein by reference in its entirety.

<Other Steps>

For various other steps in manufacturing the magnetic tape, reference can be made to paragraphs 0067 to 0070 of Japanese Unexamined Patent Publication (KOKAI) No. 2010-231843.

<Embodiment of Desirable Manufacturing Method>

An example of a desirable manufacturing method is one in which vibration is applied to the coating layer of the backcoat layer-forming composition to enhance uniformity of the thickness of the liquid film of fatty acid ester on the surface of the magnetic tape on the backcoat layer side. The present inventors presume that applying vibration can cause the liquid film of fatty acid ester on the surface of the coating layer to flow, enhancing uniformity of the thickness of the liquid film of fatty acid ester forming on the surface on the backcoat layer side. The present inventors presume that enhancing uniformity of the thickness of the liquid film is desirable to control the full width at half maximum of the spacing distribution before vacuum heating $FWHM_{before}$ to greater than 0 nm and less than or equal to 10.0 nm.

That is, an aspect of the present invention relates to a method of manufacturing the above magnetic tape including:

forming a backcoat layer by coating and drying a backcoat layer-forming composition containing nonmagnetic powder, binder, and a fatty acid ester on one surface of a nonmagnetic support to form a coating layer; and applying vibration to the coating layer that has been formed.

With the exception that vibration is applied to the coating layer of the backcoat layer-forming composition, this is identical to the manufacturing process of a common magnetic tape, the details of which are as set forth above.

The means of applying the vibration is not specifically limited. For example, the opposite surface from the coating layer of a nonmagnetic support on which a coating layer of backcoat layer-forming composition has been formed is contacted with a vibration-imparting unit to apply vibration to the coating layer. The nonmagnetic support on which the coating layer has been formed can be run while being brought into contact with a vibration-imparting unit. The vibration can be ultrasonic vibration. For example, by equipping the interior of the vibration-imparting unit with an ultrasonic vibrator, it is possible to apply ultrasonic vibration to a product that has been brought into contact with the unit. The vibration that is applied to the coating layer can be adjusted by means of the vibration frequency and intensity of the ultrasonic vibration and the period of contact with the vibration-imparting unit. For example, the contact period can be adjusted by means of the running speed during contact of the vibration-imparting unit and the nonmagnetic support on which the coating layer has been formed. These vibration-imparting conditions are not specifically limited and can be established so as to control the above-described the full width at half maximum of the spacing distribution before vacuum heating $FWHM_{before}$. Preliminary testing prior to actual manufacturing can be conducted to establish and optimize the vibration-imparting conditions.

An example of a preferred manufacturing method is:
a manufacturing method including:

after having formed a backcoat layer as set forth above, coating a magnetic layer-forming composition directly on the surface on the opposite side of the nonmagnetic support from that on which the backcoat layer has been formed, or after having formed a backcoat layer as set forth above, sequentially or simultaneously multilayer coating the magnetic layer-forming composition with a nonmagnetic layer-forming composition on the opposite side of the nonmagnetic support from that on which the backcoat layer has been formed.

Desirable embodiments of the manufacturing method have been set forth above. However, the magnetic tape according to an aspect of the present invention is not limited to being manufactured by the above manufacturing methods.

The above magnetic tape can be wound on a reel disposed so as to permit rotation within a magnetic tape cartridge and housed within the magnetic tape cartridge. The magnetic tape cartridge housing the magnetic tape can be set in a drive, the magnetic tape can be run within the drive, and a signal can be recorded on the magnetic tape and/or a signal that has been recorded can be reproduced (read). When reproducing a recorded signal, the magnetic tape can exhibit good electromagnetic characteristics, permitting low dropout reproduction and reducing head damage.

EXAMPLES

The present invention will be described in greater detail below through Examples. However, the present invention is not limited to the embodiments shown in Examples. The "parts" and "percent (%)" indicated below denote "weight parts" and "weight percent (%)", unless otherwise stated.

The values of weight average molecular weight described below are those measured under the following conditions and converted to polystyrene equivalents.

GPC device: HLC-8120 (made by Tosoh)

Column: TSK gel Multipore HXL-M (7.8 mm ID (inner diameter)×30.0 cm, made by Tosoh)

Eluent: Tetrahydrofuran (THF)

Example 1

A 3.0 part quantity of 2,3-dihydroxynaphthalene (made by Tokyo Chemical Industry Co., Ltd.), 31.3 parts of a 32% solution (with a mixture of methyl ethyl ketone and toluene as solvent) of polyester polyurethane resin (UR-4800 (polar group quantity: 80 meq/kg) made by Toyobo (Japanese registered trademark)), and 570.0 parts of a solvent in the form of a 1:1 (weight ratio) mixed solution of methyl ethyl ketone and cyclohexanone were mixed with 100.0 parts of alumina powder (HIT-70 made by Sumitomo Chemical Company, Ltd. having an alpha conversion rate of above 65% and a BET specific surface area of 30 m$^2$/g) and the mixture was dispersed for 5 hours in a paint shaker in the presence of zirconia beads. Following dispersion, the dispersion and the beads were separated with a mesh, yielding an alumina dispersion.

2. Formula of Magnetic Layer-Forming Composition

| (Magnetic liquid) | |
| --- | --- |
| Ferromagnetic hexagonal barium ferrite powder | 100.0 parts |
| Ferromagnetic hexagonal barium ferrite powder (1) (see Table 1) | |
| Ferromagnetic hexagonal barium ferrite powder (2) (see table 1) | |
| SO$_3$Na group-containing polyurethane resin (weight average molecular weight: 70,000, SO$_3$Na group: 0.2 meq/g) | 14.0 parts |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (average particle size: 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) made by Nippon Polyurethane Industry Co. Ltd.) | 2.5 parts |
| (Solvents added to finish) | |
| Cyclohexanone | 200.0 parts |
| Methyl ethyl ketone | 200.0 parts |

3. Formula of Nonmagnetic Layer-Forming Composition

| | |
|---|---|
| Inorganic powder: α-iron oxide | 100.0 parts |
| Average particle size (average major axis length): 10 nm | |
| Average acicular ratio: 1.9 | |
| BET specific surface area: 75 m²/g | |
| Carbon black | 20.0 parts |
| Average particle size: 20 nm | |
| SO₃Na group-containing polyurethane resin | 18.0 parts |
| (weight average molecular weight: 70,000, SO₃Na groups: 0.2 meq/g | |
| Stearic acid | 1.0 part |
| Cyclohexanone | 300.0 parts |
| Methyl ethyl ketone | 300.0 parts |

4. Formula of Backcoat Layer-Forming Composition

| | |
|---|---|
| Nonmagnetic powder | 100.0 parts |
| Inorganic powder: α-iron oxide | |
| Blending ratio: see Table 1 | |
| Average particle size (average major axis length): 150 nm | |
| Average acicular ratio: 7 | |
| BET specific surface area: 52 m²/g | |
| Carbon black | |
| Blending ratio: see Table 1 | |
| Average particle size: 20 nm | |
| Vinyl chloride copolymer | 13.0 parts |
| Sulfonate group-containing polyurethane resin | 6.0 parts |
| Phenylphosphonic acid | 3.0 parts |
| Colloidal silica (average particle size: 150 nm) | See Table 1 |
| Cyclohexanone | 155.0 parts |
| Methyl ethyl ketone | 155.0 parts |
| Stearic acid | See Table 1 |
| Butyl stearate | See Table 1 |
| Polyisocyanate | 5.0 parts |
| Cyclohexanone | 200.0 parts |

5. Preparation of Various Layer-Forming Compositions

A magnetic layer-forming composition was prepared by the following method. The above magnetic liquid was prepared by (bead) dispersing for 24 hours the various components in a batch-type vertical sand mill. Zirconia beads 0.5 mmΦ in bead diameter were employed as the dispersion beads. The sand mill was employed to mix the magnetic liquid and abrasive liquid that had been prepared with the other components (silica sol, other components, and solvents added to finish) and the mixture was bead dispersed for 5 minutes. Subsequently, 0.5 minutes of processing (ultrasonic dispersion) was conducted with a batch-type ultrasonic device (20 kHz, 300 W). Subsequently, a filter having an average pore diameter of 0.5 m was employed to conduct filtration, yielding a magnetic layer-forming composition.

A nonmagnetic layer-forming composition was prepared by the following method. The various components excluding the stearic acid, cyclohexanone, and methyl ethyl ketone were dispersed for 24 hours in a batch-type vertical sand mill, yielding a dispersion. Zirconia beads 0.1 mmΦ in bead diameter were employed as the dispersion beads. Subsequently, the remaining components were added to the dispersion that had been obtained and the mixture was stirred in a dissolver. The dispersion thus obtained was filtered with a filter having an average pore diameter of 0.5 μm, yielding a nonmagnetic layer-forming composition.

A backcoat layer-forming composition was prepared by the following method. The various components excluding the lubricants (stearic acid and butyl stearate), polyisocyanate, and cyclohexanone were kneaded and diluted in an open kneader. Subsequently, the mixture was subjected to 12 passes of dispersion processing in a horizontal bead mill disperser using zirconia beads 1 mmΦ in bead diameter at a bead fill rate of 80 volume %, a rotor tip peripheral speed of 10 m/s, and a single pass retention time of 2 minutes. Subsequently the remaining components were added to the dispersion that had been obtained and the mixture was stirred in a dissolver. The solution thus obtained was filtered with a filter having an average pore diameter of 1 μm, yielding a backcoat layer-forming composition.

6. Fabrication of Magnetic Tapes

The backcoat layer-forming composition prepared in 5. above was coated and dried to a dry thickness of 0.60 μm on one surface of a polyethylene naphthalene support 4.50 μm in thickness to form a coating layer. Subsequently, the support on which the coating layer had been formed was placed in the vibration-imparting device shown in FIG. 1 with the opposite surface from that on which the coating layer had been formed in contact with the vibration-imparting unit. The support on which the coating layer had been formed (numeral 1 in FIG. 1) was conveyed at a rate of 0.5 m/s to impart vibration to the coating layer. In FIG. 1, numeral 2 denotes a guide roller (the numeral 2 is positioned on one of two guide rollers), and numeral 3 denotes a vibration-imparting device (vibration-imparting unit including an ultrasonic vibrator). The arrow denotes the direction of conveyance. Table 1 shows the period during which vibration was imparted as the period from when contact at some spot on the support on which the coating layer had been formed began with the vibration-imparting unit to when this contact ended. The interior of the vibration-imparting unit employed was equipped with an ultrasonic vibrator. The vibration frequency of the ultrasonic vibrator was 30 kHz and vibration was imparted at an intensity of 100 W. Subsequently, the nonmagnetic layer-forming composition prepared in 5. above was coated and dried to a dry thickness of 0.40 μm on the support on which the backcoat layer had been formed on the opposite side thereof from the surface on which the backcoat layer had been formed. Subsequently, the magnetic layer-forming composition prepared in 5. above was coated (sequentially multilayer coated) thereover in a quantity calculated to yield a dry thickness of 60 nm. While the magnetic layer-forming composition was still wet, a magnetic field with a magnetic field strength of 0.3 T was applied in a direction perpendicular to the coating surface of the magnetic layer-forming composition to conduct perpendicular orientation processing. The coating was then dried.

Subsequently, a surface smoothing treatment (calender processing) was conducted at a calender roll surface temperature of 100° C., a linear pressure of 300 kg/cm (294 kN/m), and a speed of 100 m/minute with a calender comprised solely of metal rolls. A heat treatment was then conducted for 36 hours in an environment with an ambient temperature of 70° C. Following the heat treatment, the product was slit to a width of ½ inch (0.0127 meter), yielding a magnetic tape. The more the calender processing conditions were intensified (such as by increasing the surface temperature of the calender rolls), the lower the Ra on the magnetic layer side tended to be.

Examples 2 to 13, Comparative Examples 1 to 11

With the exceptions that the formulas of the various layer-forming compositions and/or manufacturing conditions were changed to those shown in Table 1, magnetic tapes were prepared by the same method as in Example 1. The period during which vibration was imparted was adjusted by changing the conveyance speed of the support on which the coating layers were formed.

The blending ratio of inorganic powder/carbon black in the backcoat layer recorded in Table 1 is the content based on weight of the various powders relative to 100.0 weight parts of the combined content of inorganic powder and carbon black.

The blending ratio of ferromagnetic hexagonal barium ferrite powder recorded in Table 1 is the content based on weight of the various ferromagnetic hexagonal barium ferrite powders relative to 100.0 weight parts of the total quantity of ferromagnetic powder. The average particle size of the ferromagnetic hexagonal barium ferrite powder shown in Table 1 is the value of the average particle size measured by the method set forth above after collecting a required quantity from the powder lot employed to fabricate the magnetic tape. After measurement, the ferromagnetic hexagonal barium ferrite powder was used to prepare the magnetic liquid for fabricating the magnetic tape.

The thickness of the various layers of the magnetic tape and the nonmagnetic support was obtained by the following method and the above value was confirmed.

The cross section in the direction of thickness of the magnetic tape was exposed with an ion beam and the exposed cross section was then observed with a scanning electron microscope. Each thickness was obtained as the arithmetic average of the thickness observed in two locations in the direction of thickness.

7. Evaluation Methods (1) Coefficient of Friction Measured on the Base Portion of the Surface on the Magnetic Layer Side (Base Portion Friction)

Scribe marks were made in advance with a laser marker on the measurement surface and an atomic force microscope (AFM) image was measured in a portion at a certain distance (about 100 µm) from them. This was done at a viewing area 7 µm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 11, in the component map by SEM, alumina and colloidal silica were not confirmed on the base portion. Component analysis was performed there by SEM. However, component analysis is not limited to SEM, and can be conducted by known methods such as energy dispersive X-ray spectrometry (EDS), auger electron spectroscopy (AES), or the like. Measurement results are given in Table 1.

(2) Centerline Average Surface Roughness Measured on the Surface on the Magnetic Layer Side and the Surface on the Backcoat Layer Side An atomic force microscope (AFM, Nanoscope 4 made by Veeco) was employed to measure a measurement area of 40 µm×40 µm and the centerline average surface roughness Ra of the surface on the magnetic layer side and that of the surface on the backcoat layer side of the magnetic tape were obtained. The scan rate (probe displacement rate) was 40 µm/s and the resolution was 512 pixels×512 pixels.

(3) Full Width at Half Maximum of Spacing Distribution Before and after Vacuum Heating $FWHM_{before}$ and $FWHM_{after}$ The values of the full width at half maximum of the spacing distribution before and after vacuum heating $FWHM_{before}$ and $FWHM_{after}$ were determined on the surface of the backcoat layer side of the magnetic tape by the following method using a tape spacing analyzer (TSA, made by Micro Physics).

A glass sheet provided on the TSA was disposed on the backcoat layer side surface of the magnetic tape. In this state, a half-sphere made of urethane and provided on the TSA was employed as a pressing member. This half-sphere was pressed with a pressure of $5.05 \times 10^4$ N/m (0.5 atm) against the magnetic layer side surface of the magnetic tape. In this state, white light from a stroboscope provided on the TSA was irradiated through the glass sheet onto a certain area (150,000 µm² to 200,000 µm²) of the backcoat layer side surface of the magnetic tape. The reflected light obtained was passed through an interference filter (a filter selectively passing light with a wavelength of 633 nm) and received by a charge-coupled device (CCD) to obtain an interference fringe image produced by protrusions and indentation within this area.

The image was divided into 300,000 points and the distance (spacing) from the surface of the glass sheet on the magnetic tape side to the backcoat layer side surface of the magnetic tape was determined for each point. These values were plotted as a histogram, the histogram was fit to a Gaussian distribution, and the full width at half maximum obtained was adopted as the full width at half maximum of the spacing distribution.

Vacuum heating was conducted by storing the magnetic tape for 24 hours in a constant temperature vacuum drier with an internal atmospheric temperature of 70° C. to 90° C. and a degree of vacuum of greater than or equal to 200 Pa but less than or equal to 0.01 MPa.

(4) Difference ($S_{after} - S_{before}$)

The most frequent value of the histogram before vacuum heating was subtracted from the most frequent value of the histogram after vacuum heating obtained in (3) above to obtain the difference ($S_{after} - S_{before}$).

(5) Electromagnetic Characteristics (Signal-to-Noise Ratio (S/N Ratio))

A ½ inch (0.0127 meter) reel tester to which a head had been secured was employed to determine the electromagnetic characteristics (signal-to-noise ratio (S/N ratio)) by the following method.

Employing a head/tape relative speed of 5.5 m/s and a recording head in the form of a metal-in-gap (MIG) head (gap length: 0.15 µm; track width: 1.0 µm), the optimal recording current was set for each tape. A reproduction head in the form of a giant magnetoresistive (GMR) head with an element thickness of 15 nm, a shield gap of 0.1 µm, and a read width of 0.5 µm was employed. A signal was recorded at a linear recording density of 300 kfci and the reproduced signal was measured with a spectrum analyzer made by Shibasoku Corp. The ratio of the carrier signal output to the integrated noise of the full spectral band was adopted as the S/N ratio. The signal employed was a portion of the signal that had fully stabilized after the start of running of the magnetic tape. The value of Comparative Example 1 was adopted as 0 dB and S/N ratios were obtained as values relative to it. A S/N ratio of greater than or equal to 1.0 dB was determined to indicate good electromagnetic characteristics.

(6) Dropout

Dropout was measured with a ½ inch (0.0127 meter) reel tester on which a head had been secured. A signal was recorded at a linear recording density of 300 kfci using this recording head, and reproduced with a giant magnetoresistive (GMR) head with a track width of 1 μm. The number of signal omissions with a length of at least 0.4 μm and a 40% or greater drop in output relative to the average output was detected, and the number per 1 m length of tape (per 1 mm² measurement area (=track width (1 μm)×tape length (1 m)) was adopted as the dropout. From the perspective of decreasing the error rate, a dropout of less than or equal to 800/mm² was desirable, and less than or equal to 600/mm² was preferred.

(7) Edge Damage

Edge damage was evaluated by the following method.

For each of the magnetic tapes of Examples and Comparative Examples, a magnetic tape cartridge housing the magnetic tape (total magnetic tape length of 500 m) was loaded into a Linear Tape-Open Generation 5 (LTO-G5) drive made by IBM and the tape was run back and forth 1,500 times at a tension of 0.6 N and a running speed of 5 m/s.

After running, the magnetic tape cartridge was set in a reference drive (LTO-G5 drive made by IBM) and the magnetic tape was run to conduct recording and reproduction. The reproduced signal was picked up by an external analog/digital (AD) converter during running. For the track closest to one of the edges and the track closest to the other edge of the magnetic tape, signals that dropped by 70% or more relative to the average reproduction signal amplitude (the average of the values measured for each track) were counted as missing pulses and the occurrence thereof (number of times it occurred) was divided by the total length of the magnetic tape. The frequency of occurrence of missing pulses per unit length (per 1 m) of magnetic tape (referred to as the "number of missing pulses" hereinafter) was determined.

The more severe the edge damage, the higher the number of missing pulses determined by the above method. Accordingly, the number of missing pulses determined by the above method served as an indicator of edge damage. When the number of missing pulses was less than or equal to 10.0/m, the occurrence of edge damage was determined to have been inhibited to an adequate level. Since edge damage did not occur at fixed positions, in this evaluation, the higher of the measurement results for the track closest to one edge and the measurement results for the track closest to the other edge was adopted as the number of missing pulses and is given in Table 1.

The results of the above are given in Table 1. When the magnetic tape of Comparative Example 11 was subjected to the evaluation of (5) to (7) above, the surface on the backcoat layer side and the surface on the magnetic layer side were tacky and ended up sticking together, precluding running and evaluation of the magnetic tape.

TABLE 1

| | | | Unit | Ex. 1 | Ex. 2 | Ex. 3 | Ex. 4 | Ex. 5 | Ex. 6 |
|---|---|---|---|---|---|---|---|---|---|
| Magnetic layer | Ferromagnetic hexagonal barium ferrite powder (1) | Average particle size | nm | 25 | 25 | 25 | 25 | 25 | 25 |
| | | Blending ratio | % | 99.0 | 99.0 | 99.0 | 99.0 | 99.0 | 99.2 |
| | Ferromagnetic hexagonal barium ferrite powder (2) | Average particle size | nm | 55 | 55 | 55 | 55 | 55 | 55 |
| | | Blending ratio | % | 1.0 | 1.0 | 1.0 | 1.0 | 1.0 | 0.8 |
| Backcoat layer | Formula | Blending ratio of inorganic powder/carbon black | — | 90/10 | 90/10 | 100/0 | 100/0 | 70/30 | 90/10 |
| | | Content of colloidal silica | Parts | 0 | 0 | 0 | 0 | 0 | 0 |
| | | Content of stearic acid | Parts | 3.0 | 3.0 | 3.0 | 3.0 | 3.0 | 3.0 |
| | | Content of butyl stearate | Parts | 1.0 | 1.0 | 1.0 | 1.0 | 1.0 | 1.0 |
| Manufacturing conditions | Calendar condition | Calender roll surface temp. | ° C. | 100 | 100 | 100 | 100 | 100 | 100 |
| | Vibration imparting condition | Period during which vibration was imparted | Sec. | 0.6 | 2.0 | 1.2 | 2.0 | 1.2 | 1.2 |
| Magnetic layer side surface | Centerline average surface roughness Ra | | nm | 1.8 | 1.8 | 1.8 | 1.8 | 1.8 | 1.8 |
| | Base portion friction | | — | 0.28 | 0.28 | 0.28 | 0.28 | 0.28 | 0.35 |
| Backcoat layer side surface | Centerline average surface roughness Ra | | nm | 3.2 | 3.2 | 3.2 | 2.0 | 4.8 | 3.1 |
| | Full width at half maximum of the spacing distribution before vacuum heating $FWHM_{before}$ | | nm | 9.0 | 2.0 | 6.0 | 2.0 | 6.0 | 6.0 |
| | Full width at half maximum of the spacing distribution after vacuum heating $FWHM_{after}$ | | nm | 6.0 | 6.0 | 2.0 | 2.0 | 9.0 | 6.0 |
| | Difference ($S_{after} - S_{before}$) | | nm | 4.0 | 4.0 | 4.0 | 4.0 | 4.0 | 4.0 |
| Evaluation results | S/N ratio | | dB | 1.2 | 1.3 | 1.2 | 1.3 | 1.2 | 1.2 |
| | Dropout | | /mm² | 500 | 510 | 100 | 110 | 780 | 520 |
| | Number of missing pulses | | /m | 3.8 | 3.2 | 2.9 | 2.8 | 5.1 | 5.2 |

| | | | Unit | Ex. 7 | Ex. 8 | Ex. 9 | Ex. 10 | Ex. 11 | Ex. 12 | Ex. 13 |
|---|---|---|---|---|---|---|---|---|---|---|
| Magnetic layer | Ferromagnetic hexagonal barium ferrite powder (1) | Average particle size | nm | 25 | 25 | 25 | 25 | 25 | 25 | 25 |
| | | Blending ratio | % | 95.0 | 99.0 | 99.0 | 99.0 | 99.0 | 99.0 | 99.0 |
| | Ferromagnetic hexagonal barium ferrite powder (2) | Average particle size | nm | 55 | 55 | 55 | 55 | 55 | 55 | 55 |
| | | Blending ratio | % | 5.0 | 1.0 | 1.0 | 1.0 | 1.0 | 1.0 | 1.0 |
| Backcoat layer | Formula | Blending ratio of inorganic powder/carbon black | — | 90/10 | 90/10 | 90/10 | 90/10 | 90/10 | 90/10 | 90/10 |
| | | Content of colloidal silica | Parts | 0 | 0 | 0 | 0 | 0 | 0 | 0 |
| | | Content of stearic acid | Parts | 3.0 | 3.0 | 3.0 | 3.0 | 3.0 | 1.0 | 9.0 |
| | | Content of butyl stearate | Parts | 1.0 | 0.1 | 2.5 | 1.0 | 1.0 | 1.0 | 1.0 |
| Manufacturing conditions | Calendar condition | Calender roll surface temp. | ° C. | 100 | 100 | 100 | 110 | 120 | 100 | 100 |
| | Vibration imparting condition | Period during which vibration was imparted | Sec. | 1.2 | 1.2 | 1.2 | 1.2 | 1.2 | 0.6 | 0.6 |
| Magnetic layer side surface | Centerline average surface roughness Ra | | nm | 1.8 | 1.8 | 1.8 | 1.6 | 1.4 | 1.8 | 1.8 |
| | Base portion friction | | — | 0.20 | 0.28 | 0.28 | 0.28 | 0.28 | 0.28 | 0.28 |

TABLE 1-continued

|  |  | Unit |  |  |  |  |  |  |  |
|---|---|---|---|---|---|---|---|---|---|
| Backcoat layer side surface | Centerline average surface roughness Ra | nm | 3.2 | 3.1 | 3.2 | 3.0 | 3.1 | 3.2 | 3.2 |
|  | Full width at half maximum of the spacing distribution before vacuum heating $FWHM_{before}$ | nm | 6.0 | 6.0 | 6.0 | 6.0 | 6.0 | 9.0 | 9.0 |
|  | Full width at half maximum of the spacing distribution after vacuum heating $FWHM_{after}$ | nm | 6.0 | 6.0 | 6.0 | 6.0 | 6.0 | 6.0 | 6.0 |
|  | Difference ($S_{after} - S_{before}$) | nm | 4.0 | 1.0 | 8.0 | 4.0 | 4.0 | 4.0 | 4.0 |
| Evaluation results | S/N ratio | dB | 1.2 | 1.2 | 1.3 | 2.2 | 3.4 | 1.2 | 1.2 |
|  | Dropout | /mm² | 500 | 510 | 520 | 510 | 500 | 500 | 500 |
|  | Number of missing pulses | /m | 2.1 | 2.9 | 6.0 | 5.1 | 5.2 | 3.8 | 3.8 |

|  |  |  | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Magnetic layer | Ferromagnetic hexagonal barium ferrite powder (1) | Average particle size | nm | 25 | 25 | 25 | 25 | 25 | 25 |
|  |  | Blending ratio | % | 100.0 | 100.0 | 100.0 | 99.0 | 99.3 | 100.0 |
|  | Ferromagnetic hexagonal barium ferrite powder (2) | Average particle size | nm | — | — | — | 55 nm | 55 nm | — |
|  |  | Blending ratio | % | — | — | — | 1.0 | 0.7 | — |
| Backcoat layer | Formula | Blending ratio of inorganic powder/carbon black | — | 40/60 | 40/60 | 70/30 | 90/10 | 90/10 | 90/10 |
|  |  | Content of colloidal silica | Parts | 0 | 0 | 0 | 0 | 0 | 0 |
|  |  | Content of stearic acid | Parts | 3.0 | 3.0 | 3.0 | 3.0 | 3.0 | 3.0 |
|  |  | Content of butyl stearate | Parts | 0 | 0 | 0 | 1.0 | 1.0 | 1.0 |
| Manufacturing conditions | Calendar condition | Calender roll surface temp. | ° C. | 90 | 100 | 100 | 90 | 100 | 100 |
|  | Vibration imparting condition | Period during which vibration was imparted | Sec. | 0 | 0 | 0 | 1.2 | 1.2 | 1.2 |
| Magnetic layer side surface | Centerline average surface roughness Ra | | nm | 2.3 | 1.8 | 1.8 | 2.3 | 1.8 | 1.8 |
|  | Base portion friction | | — | 0.45 | 0.45 | 0.45 | 0.28 | 0.37 | 0.45 |
| Backcoat layer side surface | Centerline average surface roughness Ra | | nm | 10.2 | 10.2 | 4.8 | 3.2 | 3.2 | 3.1 |
|  | Full width at half maximum of the spacing distribution before vacuum heating $FWHM_{before}$ | | nm | 12.0 | 12.0 | 12.0 | 6.0 | 6.0 | 6.0 |
|  | Full width at half maximum of the spacing distribution after vacuum heating $FWHM_{after}$ | | nm | 12.0 | 12.0 | 9.0 | 6.0 | 6.0 | 6.0 |
|  | Difference ($S_{after} - S_{before}$) | | nm | 0 | 0 | 0 | 4.0 | 4.0 | 4.0 |
| Evaluation results | S/N ratio | | dB | 0 | 1.2 | 1.2 | 0 | 1.3 | 1.2 |
|  | Dropout | | /mm² | 1550 | 1550 | 780 | 500 | 510 | 520 |
|  | Number of missing pulses | | /m | 3.8 | 14.2 | 22.8 | 17.0 | 22.6 | 26.4 |

|  |  |  | Unit | Comp. Ex. 7 | Comp. Ex. 8 | Comp. Ex. 9 | Comp. Ex. 10 | Comp. Ex. 11 |
|---|---|---|---|---|---|---|---|---|
| Magnetic layer | Ferromagnetic hexagonal barium ferrite powder (1) | Average particle size | nm | 25 | 25 | 25 | 25 | 25 |
|  |  | Blending ratio | % | 99.0 | 99.0 | 99.0 | 99.0 | 99.0 |
|  | Ferromagnetic hexagonal barium ferrite powder (2) | Average particle size | nm | 55 nm | 55 nm | 55 nm | 55 nm | 55 nm |
|  |  | Blending ratio | % | 1.0 | 1.0 | 1.0 | 1.0 | 1.0 |
| Backcoat layer | Formula | Blending ratio of inorganic powder/carbon black | — | 90/10 | 0/100 | 90/10 | 90/10 | 90/10 |
|  |  | Content of colloidal silica | Parts | 0 | 0 | 5.0 | 0 | 0 |
|  |  | Content of stearic acid | Parts | 3.0 | 3.0 | 3.0 | 3.0 | 3.0 |
|  |  | Content of butyl stearate | Parts | 1.0 | 1.0 | 1.0 | 0 | 3.0 |
| Manufacturing conditions | Calendar condition | Calender roll surface temp. | ° C. | 100 | 100 | 100 | 100 | 100 |
|  | Vibration imparting condition | Period during which vibration was imparted | Sec. | 0 | 1.2 | 1.2 | 1.2 | 1.2 |
| Magnetic layer side surface | Centerline average surface roughness Ra | | nm | 1.8 | 1.8 | 1.8 | 1.8 | 1.8 |
|  | Base portion friction | | — | 0.28 | 0.28 | 0.28 | 0.28 | 0.28 |
| Backcoat layer side surface | Centerline average surface roughness Ra | | nm | 3.2 | 16.5 | 3.2 | 3.1 | 3.2 |
|  | Full width at half maximum of the spacing distribution before vacuum heating $FWHM_{before}$ | | nm | 12.0 | 6.0 | 6.0 | 6.0 | 6.0 |
|  | Full width at half maximum of the spacing distribution after vacuum heating $FWHM_{after}$ | | nm | 6.0 | 12.0 | 12.0 | 6.0 | 6.0 |
|  | Difference ($S_{after} - S_{before}$) | | nm | 4.0 | 4.0 | 4.0 | 0 | 10.0 |
| Evaluation results | S/N ratio | | dB | 1.2 | 1.3 | 1.2 | 1.3 | Evaluation was impossible. |
|  | Dropout | | /mm² | 500 | 3100 | 520 | 510 |  |
|  | Number of missing pulses | | /m | 30.2 | 2.5 | 29.0 | 19.4 |  |

Sticking occurred.

Based on the results in Table 1, the magnetic tapes of Examples exhibited high S/N ratios and were determined to have inhibited the occurrence of dropout and edge damage.

An aspect of the present invention can be useful in the technical field of magnetic tapes, such as data backup tapes Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises, on one surface of a nonmagnetic support, a magnetic layer comprising ferromagnetic powder and binder, and on the other surface of the nonmagnetic support, a backcoat layer comprising nonmagnetic powder and binder, wherein:
a centerline average surface roughness Ra on a surface on the magnetic layer side of the magnetic tape is less than or equal to 1.8 nm;
a coefficient of friction measured on a base portion of the surface on the magnetic layer side of the magnetic tape is less than or equal to 0.35;
a centerline average surface roughness Ra measured on a surface on the backcoat layer side of the magnetic tape is less than or equal to 5.0 nm;
the backcoat layer comprises a fatty acid ester;
a full width at half maximum of a spacing distribution measured by optical interferometry on the surface on the backcoat layer side of the magnetic tape before vacuum heating the magnetic tape is greater than 0 nm but less than or equal to 10.0 nm;
a full width at half maximum of a spacing distribution measured by optical interferometry on the surface on the backcoat layer side of the magnetic tape after vacuum heating the magnetic tape is greater than 0 nm but less than or equal to 10.0 nm; and
a difference, $S_{after}-S_{before}$, between a spacing $S_{after}$ measured by optical interferometry on the surface on the backcoat layer side of the magnetic tape after vacuum heating the magnetic tape and a spacing $S_{before}$ measured by optical interferometry on the surface on the backcoat layer side of the magnetic tape before vacuum heating the magnetic tape is greater than 0 nm but less than or equal to 8.0 nm.

2. The magnetic tape according to claim 1,
wherein the centerline average surface roughness Ra measured on the surface on the magnetic layer side is greater than or equal to 1.2 nm but less than or equal to 1.8 nm.

3. The magnetic tape according to claim 1,
wherein the centerline average surface roughness Ra measured on the surface of the backcoat layer is greater than or equal to 1.5 nm but less than or equal to 5.0 nm.

4. The magnetic tape according to claim 1,
wherein the full width at half maximum of the spacing distribution measured by optical interferometry on the surface on the backcoat layer side of the magnetic tape before vacuum heating the magnetic tape falls within a range of 1.0 nm to 8.0 nm.

5. The magnetic tape according to claim 1,
wherein the full width at half maximum of the spacing distribution measured by optical interferometry on the surface on the backcoat layer side of the magnetic tape after vacuum heating the magnetic tape falls within a range of 1.0 nm to 8.0 nm.

6. The magnetic tape according to claim 1,
wherein the difference, $S_{after}-S_{before}$, falls within a range of 1.0 nm to 7.0 nm.

7. The magnetic tape according to claim 1,
wherein the coefficient of friction measured on the base portion of the surface on the magnetic layer side of the magnetic tape falls within a range of 0.15 to 0.30.

8. The magnetic tape according to claim 1,
wherein the nonmagnetic powder contained in the backcoat layer is one or more types of nonmagnetic powder selected from the group consisting of inorganic powder and carbon black.

9. The magnetic tape according to claim 8,
wherein a ratio accounted for by the inorganic powder falls within a range of 50.0 weight parts to 100.0 weight parts per 100.0 weight parts of a total quantity of the nonmagnetic powder contained in the backcoat layer.

10. A method of manufacturing a magnetic tape,
wherein the magnetic tape is a magnetic tape which comprises, on one surface of a nonmagnetic support, a magnetic layer comprising ferromagnetic powder and binder, and on the other surface of the nonmagnetic support, a backcoat layer comprising nonmagnetic powder and binder, wherein:
a centerline average surface roughness Ra on a surface on the magnetic layer side of the magnetic tape is less than or equal to 1.8 nm;
a coefficient of friction measured on a base portion of the surface on the magnetic layer side of the magnetic tape is less than or equal to 0.35;
a centerline average surface roughness Ra measured on a surface on the backcoat layer side of the magnetic tape is less than or equal to 5.0 nm;
a full width at half maximum of a spacing distribution measured by optical interferometry on the surface on the backcoat layer side of the magnetic tape before vacuum heating the magnetic tape is greater than 0 nm but less than or equal to 10.0 nm;
a full width at half maximum of a spacing distribution measured by optical interferometry on the surface on the backcoat layer side of the magnetic tape after vacuum heating the magnetic tape is greater than 0 nm but less than or equal to 10.0 nm; and
a difference, $S_{after}-S_{before}$, between a spacing $S_{after}$ measured by optical interferometry on the surface on the backcoat layer side of the magnetic tape after vacuum heating the magnetic tape and a spacing $S_{before}$ measured by optical interferometry on the surface on the backcoat layer side of the magnetic tape before vacuum heating the magnetic tape is greater than 0 nm but less than or equal to 8.0 nm; and
the method comprises:
coating and drying a backcoat layer-forming composition comprising nonmagnetic powder, binder, and a fatty acid ester on one surface of a nonmagnetic support to form a coating layer; and
applying vibration to the coating layer that has been formed to form a backcoat layer.

11. The method of manufacturing a magnetic tape according to claim 10,
wherein the vibration is ultrasonic vibration.

12. The method of manufacturing a magnetic tape according to claim 10,
wherein, in the magnetic tape, the centerline average surface roughness Ra measured on the surface on the magnetic layer side is greater than or equal to 1.2 nm but less than or equal to 1.8 nm.

13. The method of manufacturing a magnetic tape according to claim 10,
wherein, in the magnetic tape, the centerline average surface roughness Ra measured on the surface of the backcoat layer is greater than or equal to 1.5 nm but less than or equal to 5.0 nm.

14. The method of manufacturing a magnetic tape according to claim 10,
wherein, in the magnetic tape, the full width at half maximum of the spacing distribution measured by optical interferometry on the surface on the backcoat layer side of the magnetic tape before vacuum heating the magnetic tape falls within a range of 1.0 nm to 8.0 nm.

15. The method of manufacturing a magnetic tape according to claim 10,
wherein, in the magnetic tape, the full width at half maximum of the spacing distribution measured by optical interferometry on the surface on the backcoat layer side of the magnetic tape after vacuum heating the magnetic tape falls within a range of 1.0 nm to 8.0 nm.

16. The method of manufacturing a magnetic tape according to claim 10,
wherein, in the magnetic tape, the difference, $S_{after} - S_{before}$, falls within a range of 1.0 nm to 7.0 nm.

17. The method of manufacturing a magnetic tape according to claim 10,
wherein, in the magnetic tape, the coefficient of friction measured on the base portion of the surface on the magnetic layer side of the magnetic tape falls within a range of 0.15 to 0.30.

18. The method of manufacturing a magnetic tape according to claim 10,
wherein, in the magnetic tape, the nonmagnetic powder contained in the backcoat layer is one or more types of nonmagnetic powder selected from the group consisting of inorganic powder and carbon black.

19. The method of manufacturing a magnetic tape according to claim 18,
wherein, in the magnetic tape, a ratio accounted for by the inorganic powder falls within a range of 50.0 weight parts to 100.0 weight parts per 100.0 weight parts of a total quantity of the nonmagnetic powder contained in the backcoat layer.

* * * * *